(12) United States Patent
Vanotti et al.

(10) Patent No.: US 9,005,333 B1
(45) Date of Patent: Apr. 14, 2015

(54) SYSTEMS AND METHODS FOR REDUCING AMMONIA EMISSIONS FROM AND FOR RECOVERING THE AMMONIA LIQUID EFFLUENTS

(75) Inventors: Matias B. Vanotti, Florence, SC (US); Ariel A. Szogi, Florence, SC (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 608 days.

(21) Appl. No.: 13/164,363

(22) Filed: Jun. 20, 2011

(51) Int. Cl.
| | |
|---|---|
| *B01D 53/22* | (2006.01) |
| *B01D 19/00* | (2006.01) |
| *C01C 1/28* | (2006.01) |
| *C02F 9/00* | (2006.01) |
| *B01D 53/58* | (2006.01) |

(52) U.S. Cl.
CPC ..................................... *B01D 53/58* (2013.01)

(58) Field of Classification Search
CPC ...... B01D 19/00; B01D 53/22; B01D 53/229; B01D 53/58; B01D 61/362; B01D 63/02; B01D 63/08; B01D 2257/406; C02F 2101/105; C02F 2209/06

USPC ........... 95/45, 46, 47; 96/4, 6, 8, 10; 210/631, 210/640, 724, 259, 906; 423/299, 409, 549, 423/550

See application file for complete search history.

(56) References Cited

U.S. PATENT DOCUMENTS

| | | | | |
|---|---|---|---|---|
| 6,838,069 | B2 * | 1/2005 | Blonigen et al. | 423/352 |
| 6,893,567 | B1 * | 5/2005 | Vanotti et al. | 210/631 |
| 7,674,379 | B2 * | 3/2010 | Vanotti et al. | 210/631 |
| 8,303,921 | B2 * | 11/2012 | Brietzke et al. | 423/549 |
| 2007/0039893 | A1 * | 2/2007 | Kemp et al. | 210/660 |
| 2011/0048230 | A1 * | 3/2011 | Baldi et al. | 95/85 |
| 2011/0229403 | A1 * | 9/2011 | Szogi et al. | 423/549 |
| 2012/0315209 | A1 * | 12/2012 | Bisson et al. | 423/352 |

* cited by examiner

*Primary Examiner* — Jason M Greene
(74) *Attorney, Agent, or Firm* — Gail E. Poulos; John D. Fado; Lesley Shaw

(57) ABSTRACT

A system and method for passive capture of ammonia in an ammonia-containing liquid effluent. The invention allows for the passage of ammonia through microporous hydrophobic gas-permeable membranes and its capture in a circulated stripping solution with concomitant production of a concentrated non-volatile ammonium salt.

25 Claims, 17 Drawing Sheets

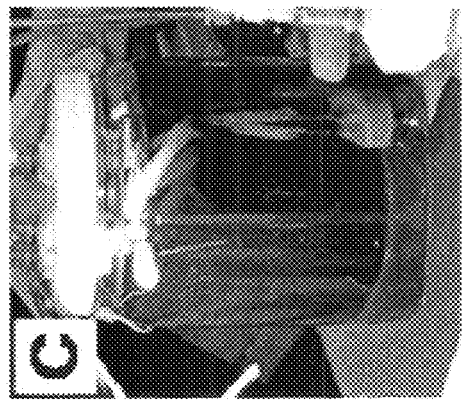
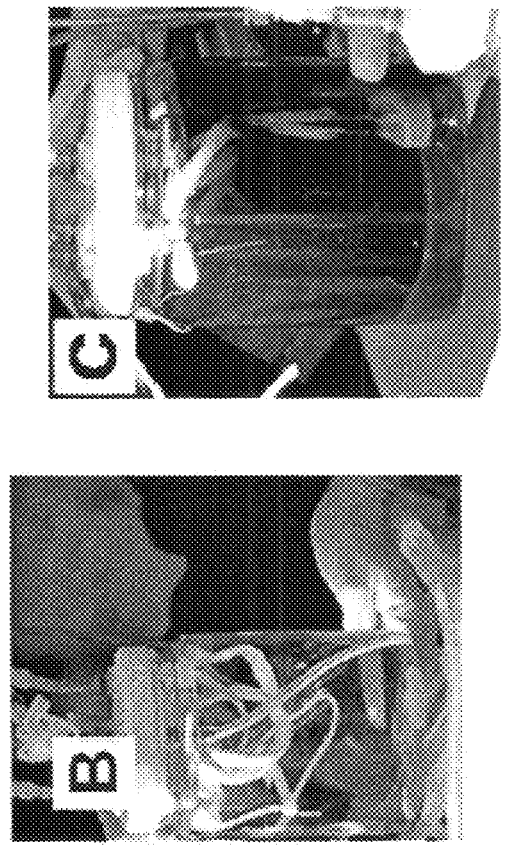
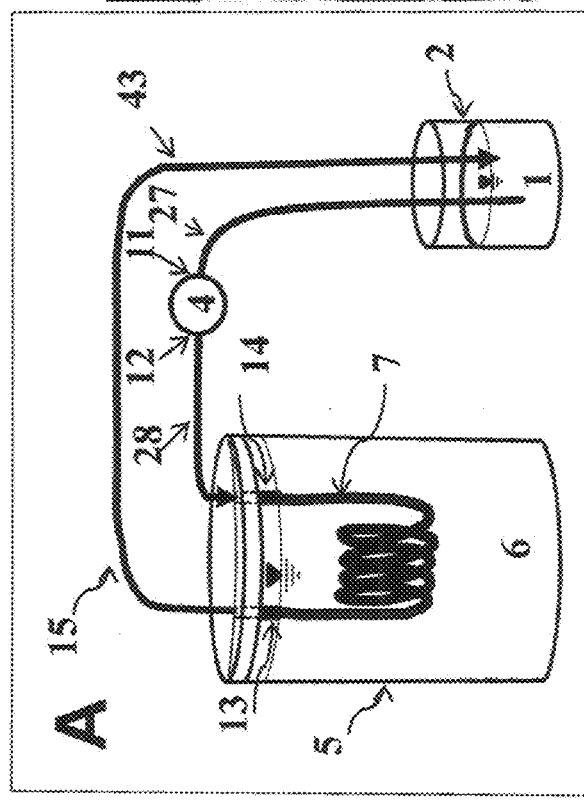
Fig. 3

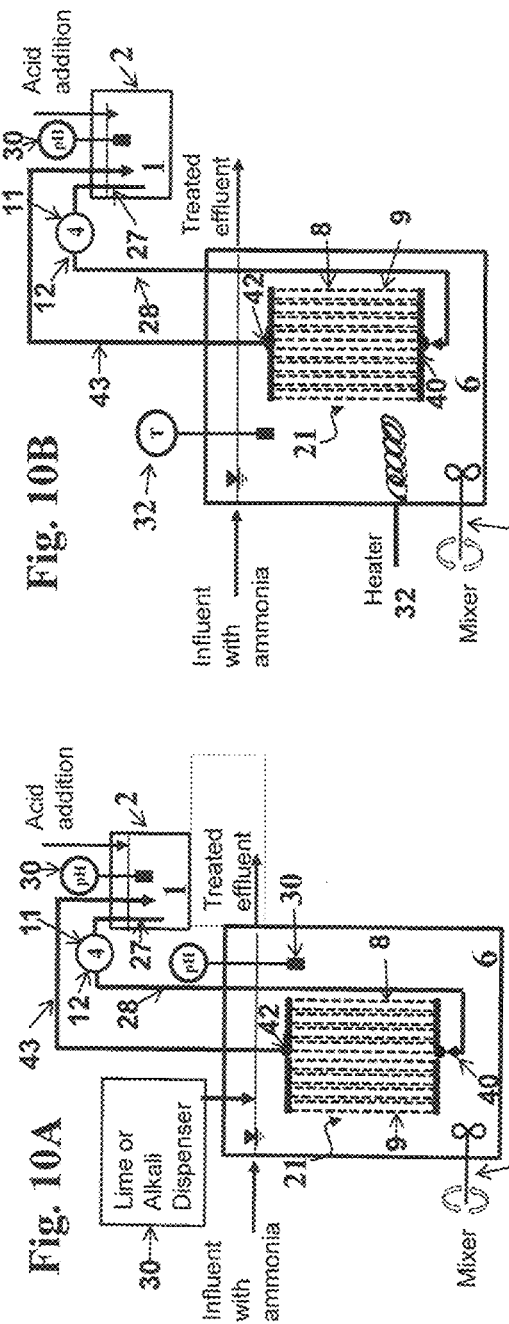
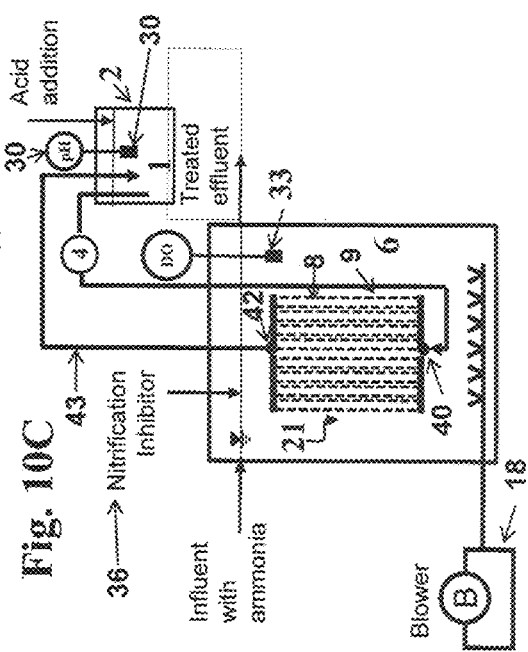
Fig. 10A
Fig. 10B
Fig. 10C

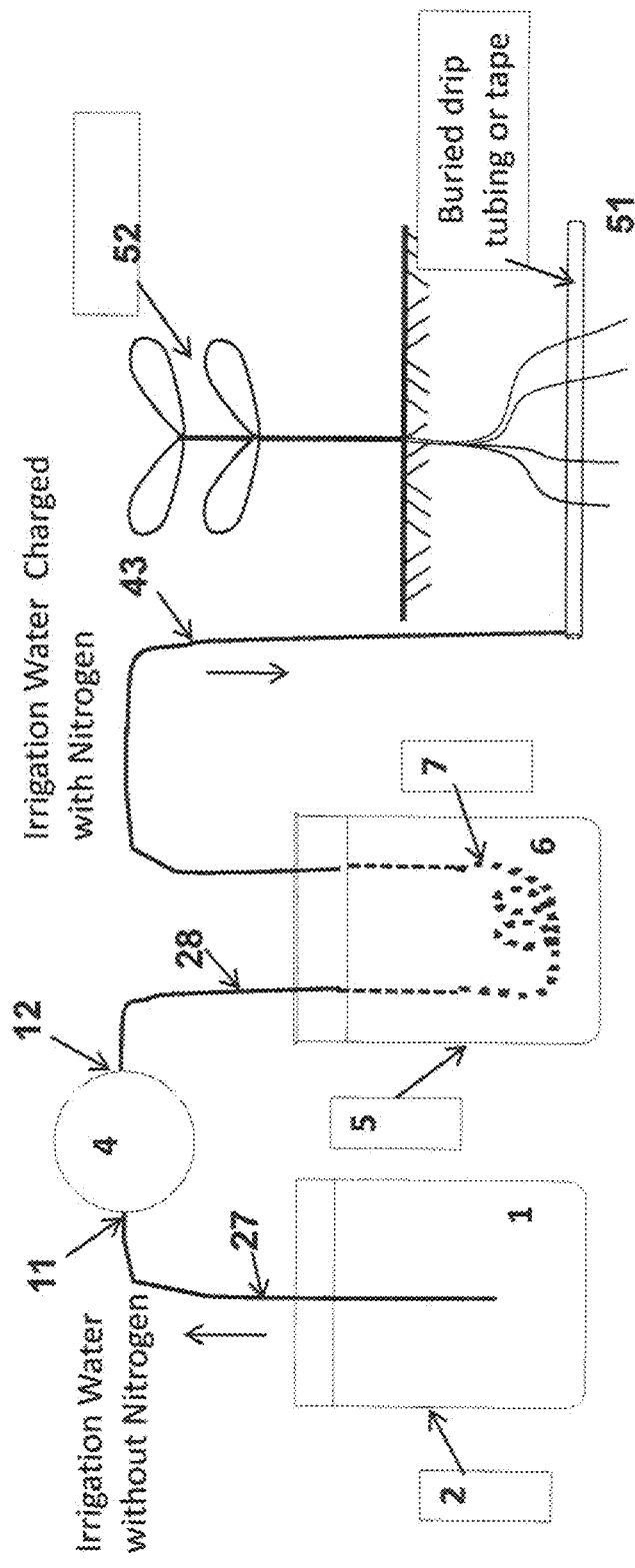

SYSTEMS AND METHODS FOR REDUCING AMMONIA EMISSIONS FROM AND FOR RECOVERING THE AMMONIA LIQUID EFFLUENTS

FIELD OF THE INVENTION

This invention relates to a system 20 and methods for the removal, recovery and use of ammonia from ammonia-containing liquid effluents such as for example animal and municipal wastewater.

BACKGROUND OF THE ART

Municipal and agricultural waste disposal is a major problem. For agricultural animals, the animals are confined in high densities and lack functional and sustainable waste treatment systems. The liquid wastes are generally treated in large anaerobic lagoons with intermittent disposal through land applications (Stith, P. and Warrick, J., Boss Hog: North Carolina's pork revolution, The News & Observer, 1-3, February 19-26, 1995; USEPA, Proposed regulations to address water pollution from concentrated animal feeding operations, EPA 833-F-00-016, January 2001, Office of Water, Washington, D.C., 20460). This system was developed in the early and mid $20^{th}$ century prior to the current trend in high concentrated livestock operations. One of the main problems in sustainability is the imbalance of nitrogen (N) and phosphorus applied to land (USEPA, supra; Cochran et al., Dollars and Sense: An economic analysis of alternative hog waste management technologies, Environmental Defenses, Washington, D.C., 2000). Nutrients in manure are not present in the same portion needed by crops, and when manure is applied based on a crop's nitrogen requirement, excessive phosphorus is applied resulting in phosphorus accumulation in soil, phosphorus runoff, and eutrophication of surface waters (Heathwaite et al., A conceptual approach for integrating phosphorus and nitrogen management at watershed scales, J. Environ. Qual., Volume 29, 158-166, 2000; Sharpley et al., Practical and innovative measures for the control of agricultural phosphorus losses to water: An overview, J. Environ. Qual., Volume 29, 1-9, 2000; Edwards and Daniel, Environmental Impacts of ON-Farm Poultry Waste Disposal-A Review, Bioresource Technology, Volume 41, 9-33, 1992).

The change from small individual animal production operations to large, confined, commercial enterprises has caused many problems for the animal production industry including emission of ammonia ($NH_3$) from lagoons. It may be anticipated that about 50-80% of the nitrogen (N) entering animal lagoons will escape to the atmosphere through $NH_3$ volatilization (Miner and Hazen, Transportation and application of organic wastes to land, In: Soils for Management of Organic Wastes and Waste Waters, 379-425, eds: L. F. Elliot and F. J. Stevenson, Madison. Wis.: ASA/SCCA/SSSA; Barrington and Moreno, Swine Manure Nitrogen Conservation Using Sphagnum Moss, J. Environ. Quality, Volume 24, 603-607, 1995; Braum et al, Nitrogen Losses from a Liquid Dairy Manure Management System, I: Agron. Abstracts, Madison, Wis., ASA, 1997). Biological removal of nitrogen through the process of nitrification and denitrification is regarded as the most efficient and economically feasible method available for removal of nitrogen from wastewaters (Tchobanoglous, G. and F. L. Burton, Wastewater Engineering and Treatment, Disposal and Reuse, Boston, Mass.: Irwin/McGraw-Hill, 1991). The effectiveness of the biological nitrogen removal process depends on the ability of nitrifying organisms to oxidize ammonium ions ($NH_4^+$) to nitrite ($NO_2^-$) and nitrate ($NO_3^-$). Subsequent reduction of molecular nitrogen, denitrification, may be essential as well if one desires to reduce total nitrogen as well as ammonia nitrogen.

Conservation and recovery of nitrogen(N) from wastes is important in agriculture because of the high cost of commercial nitrogen fertilizers. One of the largest environmental concerns with livestock and poultry production is the loss of ammonia gas ($NH_3$) from manure (Aneja et al., 2001; Paerl, 1997). The Research Triangle Institute International (RTI, 2003) estimated the monetized economic benefits to North Carolina households of changes in environmental quality resulting from the generalized adoption of alternative waste technology (2,300 swine operations). Results indicated that adoption of technologies that provide a 50% reduction of $NH_3$ emissions accounts for an estimated benefit of $190 million// year in avoided human health impacts (RTI, 2003).

There is a major interest from producers and the public in implementing best control technologies that will abate $NH_3$ emissions from confined livestock operations by capturing and recovering nitrogen.

Continuing efforts are being made to improve agricultural, animal, and municipal waste treatment methods and apparatus. U.S. Pat. No. 5,472,472 and U.S. Pat. No. 5,078,882 (Northrup) disclose a process for the transformation of animal waste wherein solids are precipitated in a solids reactor, the treated slurry is aerobically and anaerobically treated to form an active biomass. The aqueous slurry containing bioconverted phosphorus is passed into a polishing ecoreactor zone wherein at least a portion of the slurry is converted to a beneficial humus material. In operation the system requires numerous chemical feeds and a series of wetland cells comprising microorganisms, animals, and plants. See also U.S. Pat. Nos. 4,348,285 and 4,432,869 (Groeneweg et al.); U.S. Pat. No. 5,627,069 to Powlen; U.S. Pat. No. 5,135,659 to Wartanessian; an U.S. Pat. No. 5,200,082 to Olsen et al. (relating to pesticide residues); U.S. Pat. No. 5,470,476 to Taboga; and U.S. Pat. No. 5,545,560 to Chang.

Anaerobic digestion (AD) of manures offers many environmental advantages such as biogas production and pathogen destruction. However, the inhibition of methanogens by high ammonia concentration in these wastes severely inhibits the production of biogas (Sung and Liu, Chemosphere, Volume 53, 43-52, 2003; Caller and Winter, Applied Mcirob. And Biotechnol., Volume 48, 405-410, 1997; Koster and Lettinga, Agric. Wastes, Volume 9, 205-215, 1984)

For example, Sung and Liu (2003; supra) observed a substantial drop in methane production at TAN (total ammonia nitrogen) concentration higher than 2000 mg N/L, with drops of 39% and 64% at TAN concentrations of 4920 and 5770 mg/L. The inhibitory boundary of 2000 mg/L TAN was also identified by Koster and Lettinga (1984, supra). The high ammonia nitrogen content of pig manure has been reported as the main reason for low biogas production by Angelidaki and Ahring (Applied Microbiology and Biotechnology, Volume 38, 560-564, 1993), Hansen et al (Water Research, Volume 32, 5-12, 1998), Bonmati and Flotats (Waste Management, Volume 23, 261-272, 2003). Bonmati and Flotats (2003, supra) studied air-stripping pretreatment to reduce ammonia before AD of swine manure. They found that the air-stripping of ammonia before AD significantly reduced the COD by 26-30% and the biogas production potential of the slurry and concluded that air-stripping is not an advisable pre-treatment to pig slurry anaerobic digestion. Even though the inhibition of AD bacteria by high ammonia content in manure wastes is a perpetual problem for the effective implementation of AD in swine, dairy and poultry farms, effective solutions that can remove the ammonia from the liquid effluent without damaging the carbonaceous material used for biogas production have not been found.

The use of bacteria for removal of nitrogen from wastewaters features a combination of nitrification and denitrification processes (Tchobanoglous, G., et al., Wastewater Engineering: Treatment, Disposal, and Reuse. Boston, Mass.: Irwin/McGraw-Hill, 1991). A disadvantage of the nitrification process is that large amounts of oxygen and energy are required to convert all the ammonium ($NH_4^+$) to nitrate ($NO_3^-$). The subsequent biological reduction of nitrate to nitrogen gas ($N_2$) requires heterotrophic bacteria that utilizes a carbon source to convert $NO_3^-$ into $N_2$ gas typically under anoxic conditions (Vanotti and Hunt, Transactions of the ASAE, Volume 43(2), 405-413, 2000). Given the high energy costs pertaining to nitrification and the addition of carbon source pertaining to the denitrification process, there is a need to develop a more economical treatment system for effluents containing high ammonium concentrations.

An alternative biological process to $N_2$ production via nitrite ($NO_2^-$) reduction is via anaerobic ammonia oxidation. Anaerobic ammonia oxidation is also referred to as anammox. The anammox process was recognized in a wastewater treatment system based on N mass balance (Mulder et al., FEMS Microbiol. Ecol., Volume 16, 177-184, 1995). In the anammox process, under anaerobic and autotrophic conditions, ammonium ($NH_4^+$) serves as the electron donor using nitrite ($NO_2^-$) as the electron acceptor resulting in production of harmless dinitrogen ($N_2$) gas (Strous et al., Appl. Microbiol. Biotechnol., Volume 50, 589-596, 199; Jetten et al., FEMS Microbiol. Rev., Volume 22, 421-437, 1999). The complete ammonia removal process, or deammonification, entails two sequential reactions: partial nitritation ($NH_4^+ + 1.5 O_2 + H_2O + 2H^+$) and anammox ($NH_4^+ + 1.32 NO_2^- \to 1.02 N_2 + 0.26 NO_3^- + 2 H_2O$). Although this anammox equation does not consider other reactants related to cell synthesis (Dongen et al., Water Sci. Technol., Volume 44, 154-160, 2001), it has been used to describe the basic anammox process. Compared to conventional nitrification-denitrification, these combined partial nitritation and anammox reactions save more than 50% of the oxygen supply for nitrification and 100% of the external organic carbon source for denitrification (Furukawa et al., Bioresour. Technol., Volume 100, 5437-5443, 2009). This leads to a significant reduction in energy needs of treatment and a decrease in operational costs. In addition, by-products of anammox do not include greenhouse gases. The partial nitritation can be accomplished with the inhibition of nitrite oxidizing bacteria through limited oxygen supply (Kuai et al., Applied and Environmental Microbiology, Volume 64, 4500-4506), the use of high process temperatures (Dongen et al., The Combined Sharon/Anammox Process, STOWA report, IWA Publishing, London, 2001) or enhancing free-ammonia concentration as a result of high pH and ammonium concentrations (Anthoniesen et al., Journal WPCF, Volume 48(5), 835-852, 1976).

U.S. Pat. No. 6,177,077 (Lee et al.) and U.S. Pat. No. 6,200,469 (Wallace) both relate to the removal of nitrogen and phosphorus from wastewater wherein the phosphate is removed using microorganisms in aerobic tanks which absorb the phosphorus released from denitrified wastewater. See also U.S. Pat. No. 6,113,788 to Molog et al., U.S. Pat. No. 6,117,323 to Haggerty; U.S. Pat. No. 6,139,743 to Park et al.

U.S. Pat. No. 6,893,567 (Vanotti et al.) is directed to a system for treating wastewater to at least reduce the amount of ammonia and phosphorus, as well as at least reducing the presence of infectious microorganisms by using a nirification step to reduce or eliminate carbonate and ammonium buffers contained in the wastewater, precipitating phosphorus using an alkaline earth metal and increasing the pH of the wastewater. See also U.S. Pat. No. 7,674,379 (Vanotti et al.).

Rothrock, Jr. et al. (Transactions of the ASABE, Volume 53(4), 1267-1275, 2010) disclose the removal and recovery of gaseous ammonia from poultry litter using gas-permeable membranes that includes the passage of gaseous ammonia through a microporous hydrophobic gas-permeable membrane.

Szogi et al. developed a treatment process to recover nutrients from animal wastes. The process extracts phosphorus from solid animal wastes such as for example poultry litter or animal manure solids (Szogi et al., published patent application US2009/0193863). The first step of this process extracts phosphorus from solid animal wastes using mineral or organic acids. In the second step, phosphorus is recovered by the addition of liquid lime and an organic poly-electrolyte to the liquid extract to form a calcium-containing phosphorus precipitate.

Gas-permeable membranes have been used in biomedical engineering applications in membrane oxygenator devices to imitate the function of the lungs in cardiopulmonary bypass, to add oxygen to, and to remove carbon dioxide from the blood (Gaylor, 1988). They have also been used to provide waterproof and breathable fabrics in sportswear and footwear (GORE-TEX® products, 1968). Brose and Van Eikeren (1990) used gas-permeable membranes in a method for removal of toxic ammonia formed during culturing of mammalian cells. Weiss et al. (1996) used gas-permeable membranes to efficiently aerate surface waters by transferring oxygen without bubble formation.

While various systems have been developed for removing $NH_3$ from wastewater, there still remains a need in the art for different abatement systems that removes $NH_3$ and recovers the N in a concentrated purified form. The present invention, different from prior art systems, provides such systems 20 using hydrophobic gas-permeable membranes and circulated stripping solutions to produce concentrated ammonium salt.

SUMMARY OF THE INVENTION

It is therefore an object of the present invention to provide a system 20 for at least reducing levels of $NH_3$ from ammonia-containing liquid effluents and recovering nitrogen in a purified concentrated form.

A still further object of the present invention is to provide a system 20 for at least reducing the levels of $NH_3$ in ammonia-containing liquid effluents using systems 20 that capture $NH_3$ in a circulated stripping solution with the concomitant production of a concentrated ammonium salt.

Another object of the present invention is to provide a system 20 for at least reducing the levels of $NH_3$ in ammonia-containing liquid effluents using systems 20 that capture $NH_3$ in a circulated stripping solution wherein in said solution can be an acid including organic acids such as citric, oxalic, lactic acids, etc., mineral acids such as sulfuric, hydrochloric, nitric, phosphoric, for example, or a mixture of both mineral and organic acids or their precursors such as sodium bisulfate, sulfur, corn silage, molasses, and carbohydrates or mixtures thereof.

A still further object of the present invention is to provide a system 20 for at least reducing the levels of $NH_3$ in ammonia-containing liquid effluents using systems 20 that remove $NH_3$ through the use of microporous, hydrophobic, gas-permeable membranes.

Another object of the present invention is to provide a method for at least reducing $NH_3$ in ammonia-containing liquid effluents using a system 20.

A still further object of the present invention is to provide a method for at least reducing $NH_3$ in ammonia-containing liquid effluents using a system 20 that captures $NH_3$ in a circulated stripping solution with the concomitant production of a concentrated ammonium salt.

Another object of the present invention is to provide a method for at least reducing the levels of $NH_3$ in ammonia-containing liquid effluents using systems 20 that capture $NH_3$ in a circulated stripping solution wherein in said solution can be an acid including organic acids such as citric, oxalic, lactic acids, etc., mineral acids such as sulfuric, hydrochloric, nitric, phosphoric, for example, or a mixture of both mineral and organic acids or their precursors such as sodium bisulfate, sulfur, corn silage, molasses, and carbohydrates or mixtures thereof.

A still further object of the present invention is to provide a method for at least reducing $NH_3$ in ammonia-containing liquid effluents using a system 20 having microporous, hydrophobic, gas-permeable membranes.

Another object of the present invention is to provide a method for at least reducing the levels of $NH_3$ in ammonia-containing liquid effluents using systems 20 that capture $NH_3$ in a stripping solution and an open configuration wherein said solution can be water or diluted acids including those that are the product of biological nitrification.

Further objects and advantages of the invention will become apparent from the following description.

BRIEF DESCRIPTION OF THE DRAWINGS

FIG. 3A is a diagram showing a basic configuration of ammonia capture system 20 for $NH_3$ recovery showing membrane assembly 15 having stripping solution tank 2, stripping solution 1 which is an acid, fluid pump 4, tubular hydrophobic, microporous, gas permeable membrane 7, pump intake flow line 27 and pump outtake end flow line 28, a first tubular membrane opening 13 and a second tubular membrane opening 14, and wastewater 6.

FIG. 3B is a photograph of a bench reactor with a tubular membrane 7 submerged in water.

FIG. 3C is a photograph of a bench reactor with membrane 7 submerged in liquid swine manure.

FIG. 10A is a cross sectional schematic diagram of ammonia capture system 20 from liquid effluent 6 showing the use of alkali chemical addition using a pH measurement and alkali or acid addition dispenser 30 to enhance the removal of ammonia by the membrane system. Also shown are stripping solution 1, stripping solution tank/reservoir 2, pump 4, pump intake end 11, pump discharge end 12, pump intake flow line 27, pump discharge flow line 28, ammonia delivery flow line 43 and mixer 17.

FIG. 10B is a cross sectional schematic diagram of ammonia capture system 20 from liquid effluent 6 showing heater 32 to enhance the removal of ammonia by the membrane manifold 21. A heater 32 is used to regulate the water temperature. Also shown are stripping solution 1, stripping solution tank/reservoir 2, pump 4, pump intake end 11, pump discharge end 12, pump intake flow line 27, pump discharge flow line 28, and ammonia delivery flow line 43.

FIG. 10C is a cross sectional schematic diagram of ammonia capture system 20 from liquid effluent 6 showing blower 18 and nitrification inhibiter dispenser 36 to increase pH of wastewater and enhance the removal of ammonia by the membrane manifold 21. A dissolved oxygen (DO) controller 33 is used to control aeration to maintain DO levels below 1 mg/L. Also shown are stripping solution 1, stripping solution tank/reservoir 2, pump 4, pump intake end 11, pump discharge end 12, pump intake flow line 27, pump discharge flow line 28, and ammonia delivery flow line 43.

FIG. 17 is a schematic diagram of ammonia enrichment of irrigation water using the ammonia from liquid manure that permeates through hydrophobic gas permeable membrane 7. Also shown in the diagram are irrigation water or acidified irrigation water 1, water storage tank 2, fluid pump 4, tank with liquid manure 5, liquid manure effluent 6, pump intake flow line 27, pump intake end 11, pump discharge end 12, pump discharge flow line 28, ammonia delivery flow line 43, drip tubing or tape 51, and irrigated plant 52. After passage through the membrane system, the irrigation water charged with nitrogen is delivered to the root zone of plants through buried drip tubing or tape 51.

DEPOSIT OF MICROORGANISMS

High Performance Nitrifying Sludge Culture HPNS, was deposited as NRRL deposit accession number NRRL B-50298 on Jun. 26, 2009.
Sequence of *Candidatus* Brocadia caroliniensis was 96% similar to the sequences of *Candidatus* "Brocadia" sp. having GenBank Accession numbers AM285341. A strain of *Brocadia caroliniensis* was deposited on May 12, 2009, under the provisions of the Budapest Treaty in the Agricultural Research Culture Collection (NRRL) at 1815 N. University Street, Peoria, Ill., and has been assigned Accession No. NRRL B-50286.

DETAILED DESCRIPTION

Figure 1:
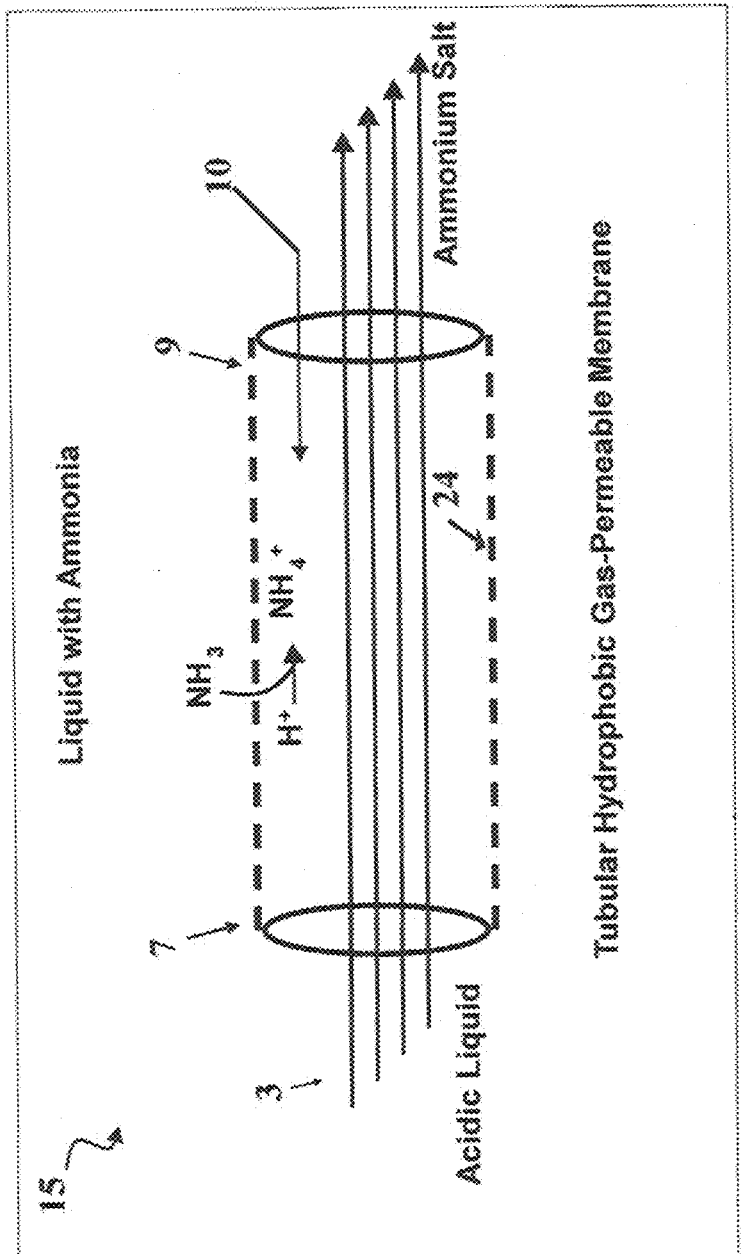
FIG. 1 is a cross-sectional drawing of ammonia capture using hydrophobic gas-permeable tubing 7. Ammonia gas ($NH_3$) permeates through micron-sized gas-filled pores 9 of membrane 7 of membrane assembly 15, where it combines with the free protons ($H^+$) in the acid solution 3 to form non-volatile ammonium ions ($NH_4^+$) in hollow interior 10.

The removal and recovery of $NH_3$ from wastes is important in agriculture because of the high cost of commercial nitrogen (N) fertilizers. The present invention is a system for treating wastewater to remove ammonia from liquid effluents, such as municipal wastes and livestock wastewater. The present invention recovers N in a concentrated purified form from liquid manures and other effluents. The invention includes the passage of $NH_3$ through microporous hydrophobic gas-permeable membranes 7 or 8 having gas-filled pores 9 (FIG. 1) and the capture of $NH_3$ in a circulated stripping solution 1 with concomitant production of a concentrated ammonium salt. Once $NH_3$ is in contact with the stripping solution 1 it reacts with free protons ($H^+$) to form non-volatile ammonium ($NH_4^+$) salt, which are retained and concentrated in the stripping solution 1 (FIG. 1). Both tubular and flat gas-permeable membrane 7 or 8 configurations are useful for extracting ammonia from liquid manures. The membranes can be assembled as manifolds 21 as will be described below.

For purposes of the present invention stripping solutions are defined as acids such as organic acids including citric, oxalic, lactic, etc., for example; mineral acids including sulfuric, hydrochloric, nitric, phosphoric, for example; and mixtures of both mineral and organic acids or their precursors such as sodium bisulfate, sulfur, corn silage, molasses and carbohydrates and mixtures thereof. Approximately 1 Normal acid solutions are preferred.

Figure 9B:
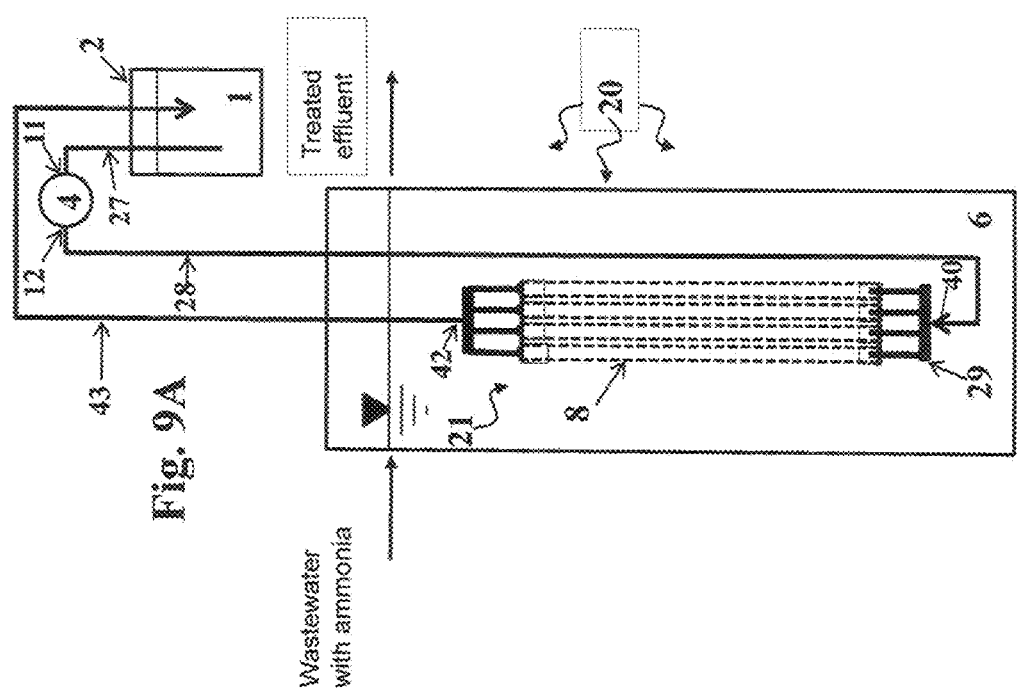
FIG. 9B is a cross section schematic diagram of ammonia ($NH_3$) capture system 20 from liquid effluent 6 using hydrophobic gas-permeable membrane manifold 19 including multiple membrane containing manifold 21 connected in series through membrane assembly connector 31. Also shown are stripping solution 1, stripping solution tank/reservoir 2, pump 4, pump intake end 11, pump discharge end 12, pump intake flow line 27, pump discharge flow line 28, and ammonia delivery flow line 43.
Figure 9A:
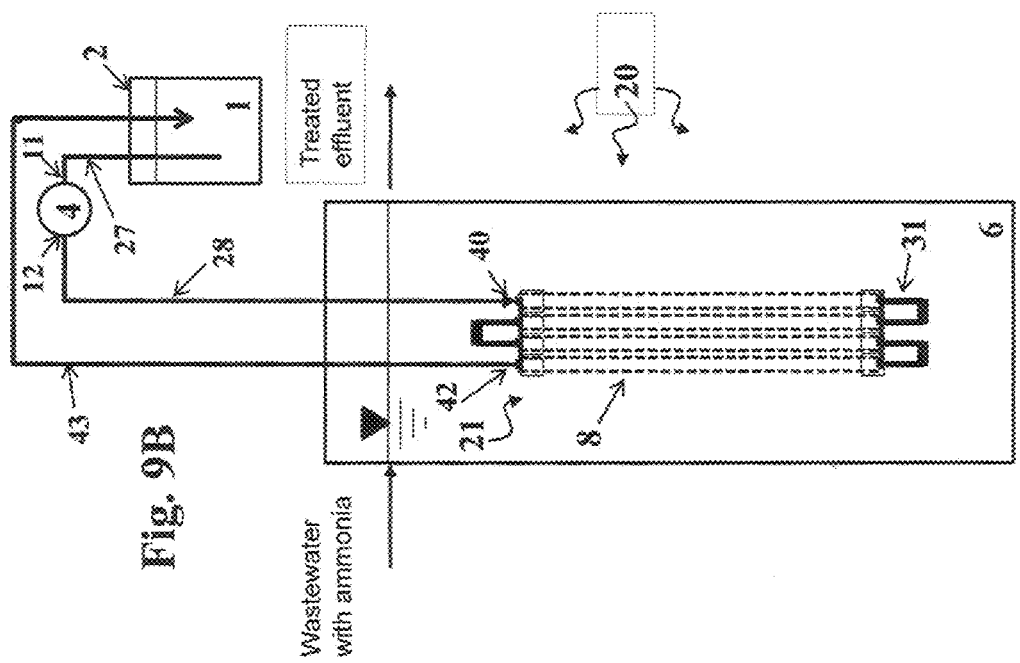
FIG. 9A is a cross section schematic diagram of ammonia ($NH_3$) capture system 20 from liquid effluent 6 using hydrophobic gas-permeable membrane manifold 19 including multiple membranes 8 connected in parallel through a stripping solution splitter 29. Also shown are stripping solution 1, stripping solution tank/reservoir 2, pump 4, pump intake end 11, pump discharge end 12, pump intake flow line 27, pump discharge flow line 28, and ammonia delivery flow line 43.

For purposes of the present invention, a membrane manifold includes multiple membranes connected in parallel through a stripping solution splitter 29 or in series through a connector 31 (FIGS. 9A and 9B).

Hydrophobic, gas-permeable membranes 7 or 8 can be, for example, polypropylene (Shindo et al., Gas transfer process with hollow fiber membrane. Japan: Mitsubishi Rayon, Co., Ltd., 1981), polyethylene/polyurethane composites (Lee and Rittmann, Water Science Technology 41:219-226, 2000), or polytetrafluoroethylene (PTFE) (Blet et al, 1989). Membranes can be tubular 7 or flat 8. Gas permeable membranes 7 and 8 that can be used in system 20 of the invention include but are not limited to hydrophobic gas permeable hollow fiber membranes made from polypropylene (Shindo et al., Gas transfer process with hollow fiber membrane. Japan: Mitsubishi Rayon, Co., Ltd., 1981), and polyethylene/polyurethane composites (Lee and Rittmann, 2000, supra) silicone rubber (Carlson, R. M., 1978 Sutomated Separation and Conductometric Determination of Ammonia and Dissolved Organic Carbon, Anal. Chem., Volume 50, 1528-1531), polytetrafluoroethylene (PTFE) (Blet et al., Chimica Acta 219:309-3111989) or expanded polytetrafluoroethylene (ePTFE). See also U.S. Pat. No. 5,474,660 and No. 5,071,561, herein incorporated in their entirety by reference.

FIGS. 2 and 3A-C show schematics of ammonia capture from ammonia-containing liquid effluent 6 including water and liquid swine manure, wastewater tank 5, and the system 20 of the invention. A microporous, hydrophobic, gas-permeable tubular membrane 7 is disposed within the liquid effluent 6 and is in either open-loop (FIG. 2) or closed-loop (FIGS. 3A-3C) liquid communication via fluid pump 4 with a stripping solution 1 contained in tank 2.

For purposes of the present invention the term liquid effluent is defined as any liquid containing ammonia and includes water, municipal waste, livestock waste, manufacturing waste, etc.

For purposes of the present invention, the membrane assembly 15 functions as a passive getter for ammonia and as the ammonia is captured, production of more ammonia from non-volatile $NH_4$ occurs until at least 50% of the the $NH_4$ is converted to $NH_3$.

Membrane assembly 15 includes either a tubular microporous, hydrophobic, gas-permeable membrane 7 or a flat microporous, hydrophobic, gas-permeable membrane 8. The tubular membrane 7 is defined by first and second sides (not shown) and an endless circumferential material (see FIG. 1) defining a hollow interior 10 (FIG. 1). Thus the permeable tubular membrane 7 allows for the diffusion of ammonia gas concentrated outside the membrane 7 to diffuse through pores 9 to the hollow interior 10. Another embodiment of the membrane is the use of a flat, microporous, hydrophobic, gas-permeable membrane 8 such as, for example, PTFE, ePTFE, polypropylene, polypropylene-backed ePTFE laminates, nylon-baked ePTFE laminates, and polyethylene-backed ePTFE laminates Flat membrane 8 is stretched over a frame 34 forming a hollow interior 10 which contains flowing stripping solution 1. It operates by allowing for the diffusion of ammonia concentrated outside the outer surface to diffuse through pores 9 to the hollow interior 10.

Hollow, tubular gas-permeable membranes 7 typically have wall thickness ranging from about 0.1-2.0 mm, inner diameter ranging from about 0.3 mm to about 100 mm, bubble point ranging from about 3-300 kPa, and porosity ranging from about 40-80%. The tubular membranes 7 or flat membranes 8 can be assembled in manifolds 21 with several tubings 7 parallel or in series to each other using splitter 29 for a parallel arrangement or connector 31 for a series arrangement (FIGS. 9-15). Flat, gas-permeable membranes are typically defined by their membrane thickness ranging from about 0.001 to about 0.2 mm, bubble point ranging from about 3-300 kPa, and porosity ranging from about 40-80%.

The closed loop delivery system (FIGS. 3A-3C) for delivering stripping solution 1 from tank 2 to the hollow interior 10 of the microporous, hydrophobic, gas-permeable tubular membrane 7 or to hollow interior 10 of membrane assembly 15 including flat membrane 8 is composed of fluid pump 4 having an intake end 11 and discharge end 12 and at least two hollow flow lines 27 and 28. Discharge flow line 28 has one end in fluid communication to the discharge end 12 of pump 4 and a second end attached to membrane 7 or 8. Intake flow line has a first end attached to the intake end 11 of pump 4 and a second end in said tank 2 for delivering stripping solution 1 to said membrane (FIGS. 1 and 8).

For purposes of the present invention, the term stripping solution tank/reservoir 2 is defined as any size, nonreactive container for the storage of acid used in the present invention.

Figure 8:
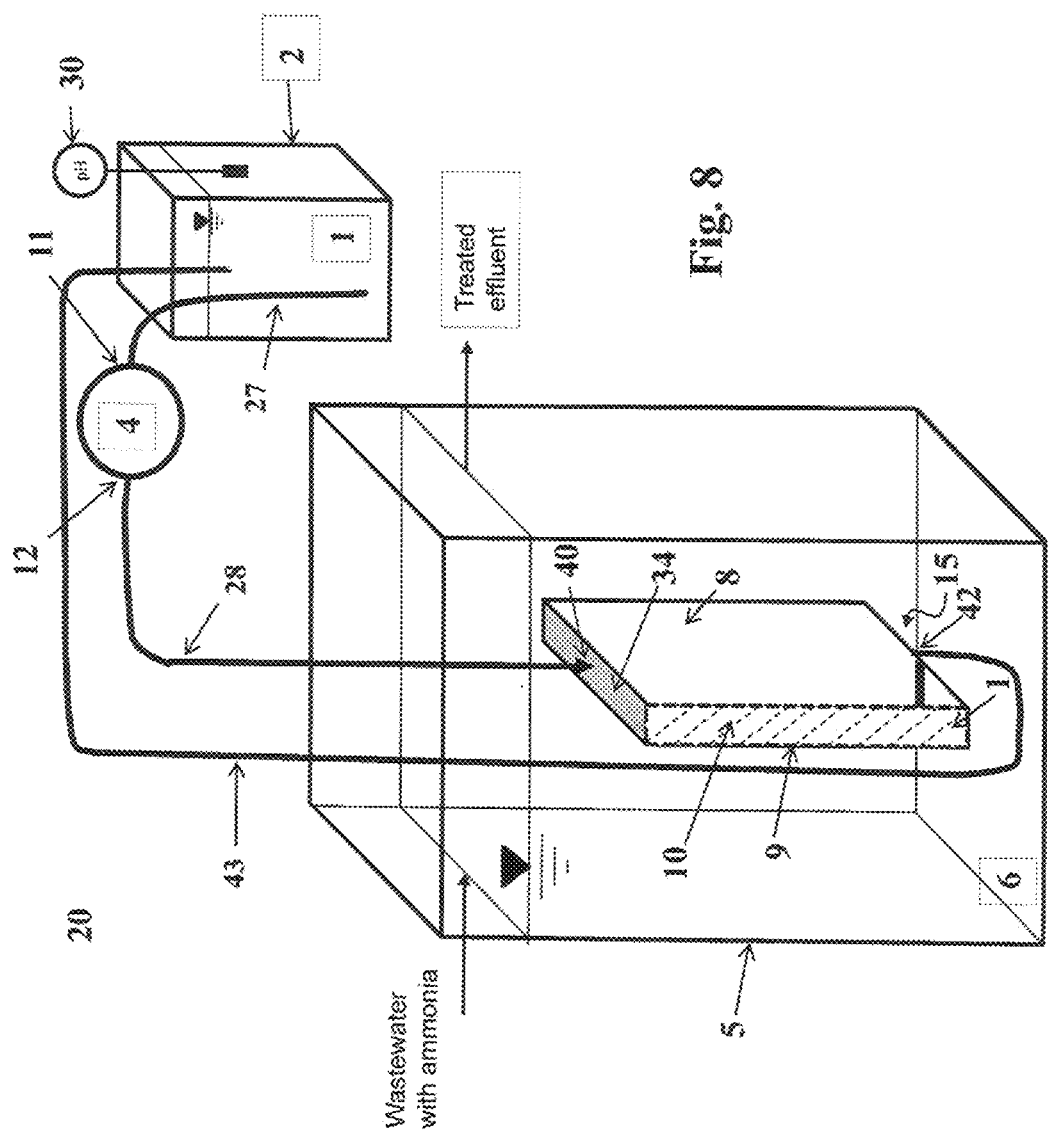
FIG. 8 is a three dimensional schematic of ammonia ($NH_3$) capture system 20 from liquid effluent 6 using hydrophobic gas-permeable flat membrane 8. Shown in the diagram are stripping solution 1 ($NH_3$ sink), stripping solution tank/reservoir 2, pH measurement and alkali or acid addition dispenser 30, fluid pump 4, pump intake end 11, pump discharge end 12, wastewater tank 5, liquid effluent 6 ($NH_3$ source), membrane assembly 15 with hydrophobic, gas-permeable flat membrane 8 stretched over a frame 34 forming a hollow interior 10 which contains flowing stripping solution 1, membrane assembly entry opening 40, and membrane assembly exit opening 42. It operates by allowing for the diffusion of ammonia from the liquid outside the outer surface through membrane pores 9 to the hollow interior 10.

As shown in FIGS. 1 and 8, the stripping solution 1 not only is a reactant making the conversion of $NH_3$ to $NH_4$ solid salts but also acts as a sweep, via the mechanical action of pump 4, moving the salts to tank 2. These salts then can be used a fertilizer.

To enhance the removal of ammonia from an ammonia-containing liquid effluent, an alkali chemical can be added to the liquid effluent to increase its pH (FIG. 10A). An example is an alkali chemical that converts $NH_4$—N to $NH_3$ according to ammonium-ammonia reaction: $NH_4^+ + OH^- \rightarrow NH_3 + H_2O$. Any chemical which will increase the formation of gaseous ammonia $NH_3$ from the wastewater can be used in the practice of this invention. Alkali useful in the present invention include, for example, calcium hydroxide, magnesium hydroxide, calcium oxide, magnesium oxide (and mixtures thereof), dolomitic lime, sodium hydroxide and potassium hydroxide. The amount of alkali to apply depends on the wastewater process pH desired and the characteristics of the wastewater. Using sodium hydroxide as an example and separated swine wastewater (table 1), a typical amount of approximately 0.46 g/L is used to increase pH from about 8.1 to about 9.0 and increasing removal of ammonia from wastewater from about 50% to about 89%.

The enhancement of the removal of ammonia from an ammonia-containing liquid effluent 6 can also be achieved using increased temperature through heater 32 (FIG. 10B). The instant formation of gaseous ammonia $NH_3$ (Free ammonia FA) as a function of temperature can be calculated using equation 1 given by Anthonisen et al. (Anthonisen, A. C., R. C. Loher, T. B. Prakasam and E. G. Srinath. 1976. Inhibition of nitrification by ammonia and nitrous acid. Journal WPCF 48:835-852.) based on temperature (° C.), pH, and total $NH_4$—N concentration (mg $L^{-1}$) values:

$$FA \text{ as } NH_3 \text{ (mg L}^{-1}) = (17/14) \times \{(NH_4-N \times 10^{pH})/[(K_b/K_w) + 10^{pH}]\} \quad (1)$$

where $K_b$ and $K_w$ are ionization constants for $NH_3$ and $H_2O$, respectively. The ratio $(K_b/K_w)$ is related to temperature: $(K_b/K_w) = \exp[6344/(273+T)]$. Using as an example separated swine wastewater (table 1), the increase of wastewater temperature from 20° C. to 30, 40, 50, 60 and 70° C. will increase $NH_3$ availability 1.9, 3.5, 5.6 8.3, and 11.0 times, respectively, without any addition of chemical to increase pH.

Another method to enhance the removal of ammonia from livestock effluents using the hydrophobic gas permeable system is the use of aeration and nitrification inhibition (FIG. 10C). Such conditions applied to stored livestock effluents results in a pH increase of about 1 unit and increased $NH_3$ release.

This has been demonstrated in experiments of aeration of anaerobic swine manure through bubbling or mixing (Vanotti and Hunt, Trans. ASAE, Volume 42(6), 1833-1840, 2000;

Zhu et al, J. Environ. Sci. Health, Volume 36(2), 209-218, 2001, Garcia et al., Trans. ASABE, Volume 50(6), 2205-2215, 2007).

The aeration of the waste needs to be accompanied by nitrification inhibition because the nitrification of ammonia reduces the pH of the liquid. Nitrification inhibition can be achieved in various effective ways such as for example: 1. removing the suspended biomass with the effluent without clarification and return; 2. increasing temperatures above 45° C.; 3. increasing the pH above 9; adding a commercial nitrification inhibitor such as 2-chloro-6 (trichloromethyl) pyridine (N-Serve). An increase of about 1 unit pH at about 30° C. in raw swine wastewater of Table 1 increases free ammonia ($NH_3$) concentration about 5.6 times (from about 153 to about 836 mg N/L).

Figure 11:
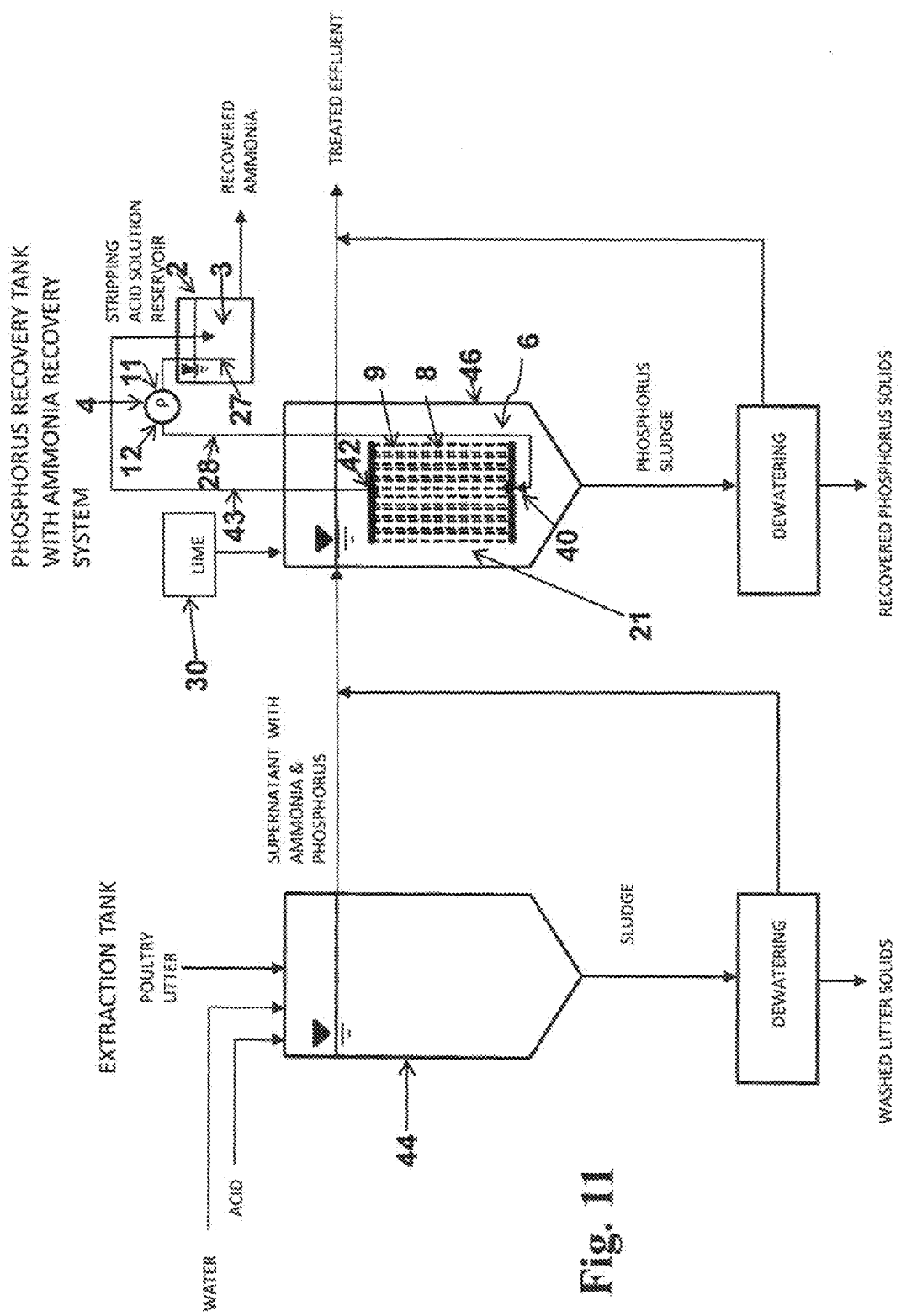
FIG. 11 is a cross sectional schematic diagram of ammonia capture system 20 from liquid effluent retrofit into a phosphorus removal tank used in Szogi et al. (US 2009/0193863A1, incorporated herein by reference). Shown are stripping solution 1, stripping solution tank/reservoir 2, pump 4, pump intake end 11, pump discharge end 12, pump intake flow line 27, pump discharge flow line 28, pH measurement and alkali or acid dispenser 30, ammonia delivery flow line 43, membrane manifold 21, membrane manifold exit opening 42, membrane manifold entry opening 40, phosphorus removal tank 46, liquid effluent 6, flat membrane 8, and micron-sized gas-filled pores 9.
Figure 12:
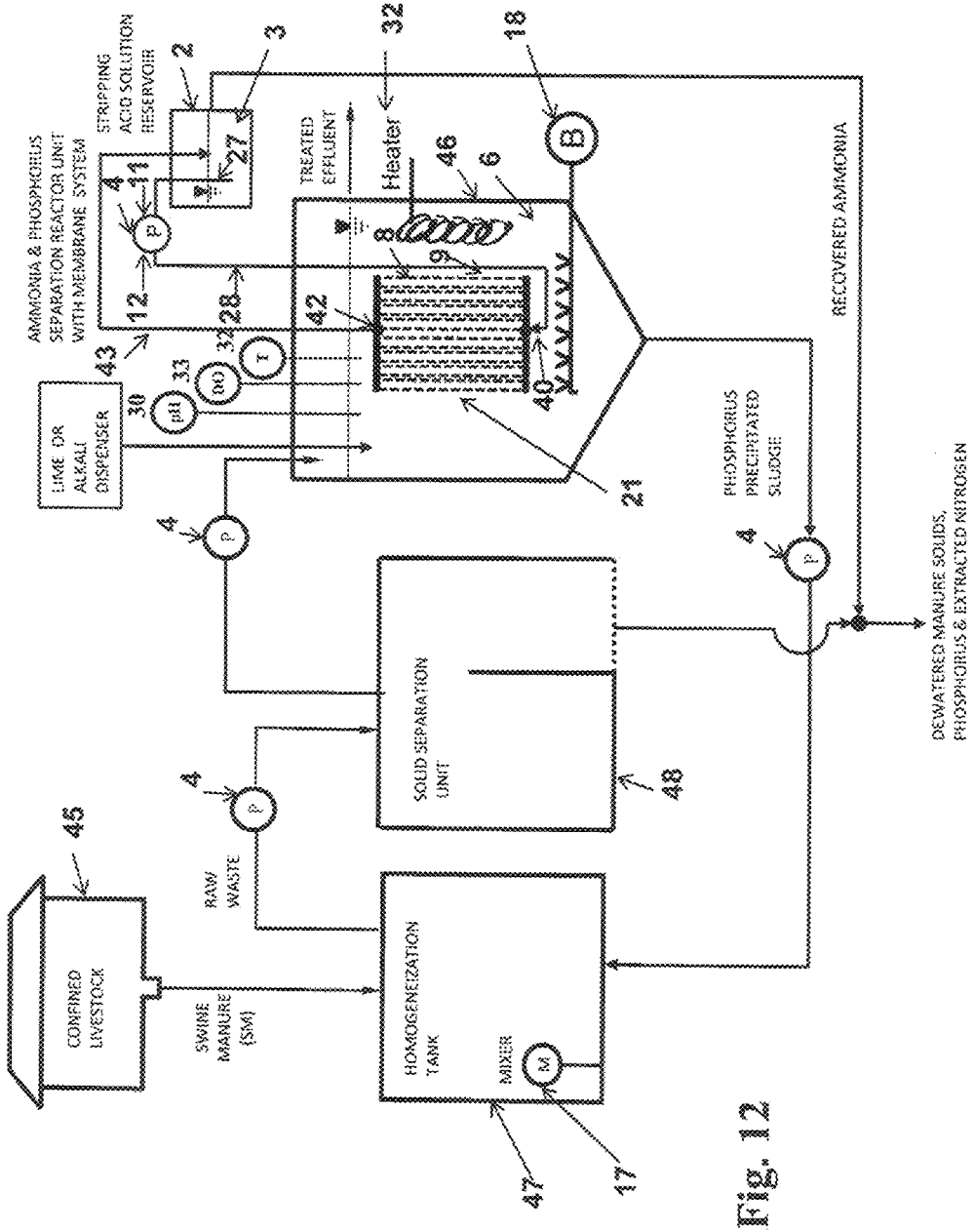
FIG. 12 is a schematic diagram of a nutrient recovery system that includes a homogenization tank 47 to mix raw manure, a solids separation unit 48, and an ammonia and phosphorus separation unit 46 that uses ammonia capture system 20 using hydrophobic gas-permeable membrane manifold 21 and. Nutrient recovery is enhanced through pH measurement and alkali or acid addition dispenser 30, heater 32, or aeration and DO control 33, or a combination thereof. Also shown are stripping solution 1, stripping solution tank/reservoir 2, pump 4, pump intake end 11, pump discharge end 12, pump intake flow line 27, pump discharge flow line 28, and ammonia delivery flow line 43.

To capture ammonia in a system for removing phosphorus from solid animal wastes, such as for example poultry litter (Szogi et al., published United States Patent Application No. 2009/0193863, Aug. 6, 2009, herein incorporated by reference in its entirety) ammonia capture system 20 was retrofitted into a phosphorus removal tank 46 to remove ammonia and phosphorus simultaneously (FIG. 11). The process extracts phosphorus from solid animal wastes such as for example poultry litter or animal manure solids (Szogi et al., August, 2009, supra). The first step of this process extracts phosphorus from solid animal wastes using mineral or organic acids in an extraction tank 44. In the second step, phosphorus is recovered by the addition of liquid lime using dispenser 30 and an organic poly-electrolyte to the liquid extract to form a calcium-containing phosphorus precipitate. FIG. 11 is a cross sectional schematic diagram of ammonia capture system 20 from liquid effluent retrofitted into a phosphorus removal tank used in Szogi et al. 2009 (supra). The addition of lime to precipitate the phosphorus also increases the free ammonia $NH_3$ concentration of the liquid effluent 6 and its availability for capture by membrane manifold 21. The membrane manifold 21 includes multiple gas-permeable membranes with micron sized gas-filled pores 9. As the pH is increased, the free ammonia $NH_3$ permeates through pores 9 and is captured with the stripping solution 1. In the first tank 44, the pH is acidic, approximately 4.5, and the content of ammonium-N ranges from approximately 163 mg N/L to approximately 408 mg/L for poultry litter extractions at about 1:25 and about 1:10 ratio litter to acid wash. In the second tank 46, addition of lime to a pH endpoint of approximately 9 to approximately 10 precipitates about 90% of the P extracted. At the same time, the same lime addition increases instant free ammonia $NH_3$ availability within the liquid from approximately 0 (pH of about 4.5) to approximately 34-50% with endpoint pH of about 9 (water temperatures of about 25-35° C.); and to approximately 80-87% with endpoint pH of about 10 (water temperatures of about 25-35° C.). Therefore, the use of the membrane manifold 21 in a phosphorus removal tank that uses alkaline pH to precipitate the phosphorus improves the phosphorus removal system by recovering both ammonia and phosphorus in concentrated forms.

Another embodiment of the present invention is using system 20 in a liquid effluent system as described U.S. Pat. No. 6,893,567 (Vanotti et al.; herein incorporated by reference in its entirety) which is directed to a system for treating wastewater to at least reduce the amount of ammonia and phosphorus, as well as at least reducing the presence of infectious microorganisms by using a solids separation step, a nitrification/denitrification step (biological N removal) to reduce ammonium and precipitating phosphorus in a phosphorus removal tank using an alkaline earth metal and increasing the pH of the wastewater. See also U.S. Pat. No. 7,674,379 (Vanotti et al.; herein incorporated by reference in its entirety). The nutrient removal system shown in FIG. 12 uses a membrane manifold 21 retrofitted in a phosphorus removal tank 46. This retrofit eliminates the biological nitrogen removal reactor units (nitrification-denitrification process) used to eliminate the ammonia in U.S. Pat. No. 6,893,567 and U.S. Pat. No. 7,674,379 (Vanotti et al.). It combines ammonia and phosphorus removal using a single separation reactor unit 46, and eliminating nitrification and denitrification unit processes. It also enables the recovery of concentrated ammonia for re-use as fertilizer, in addition to phosphorus. The nutrient recovery system includes a homogenization tank 47 to receive and mix the raw manure, a solids separation unit 48, and an ammonia and phosphorus separation unit 46 that uses ammonia capture system 20 using hydrophobic gas-permeable membrane manifold 21 and a stripping solution tank 2 in fluid communication with the membrane manifold. Nutrient recovery of ammonia and phosphorus in tank 46 is enhanced through controlled alkali dispenser 30, heater 32, or aeration and DO control 33, or a combination of both heater 32 and control 33. Characteristics of liquid effluent after solid liquid separation of liquid swine manure include soluble BOD of about 3009 mg/L, suspended solids of about 1212 mg/L, soluble COD of about 5798 mg/L, ammonium N of about 1190 mg/L, phosphorus of about 170 mg/L, and pH of about 7.81. The membrane manifold 21 is not permeable to the soluble COD or soluble BOD, and high concentration of soluble carbonaceous compounds and particle solids in effluent 6 does not affect the ammonia removal process.

Figure 13:
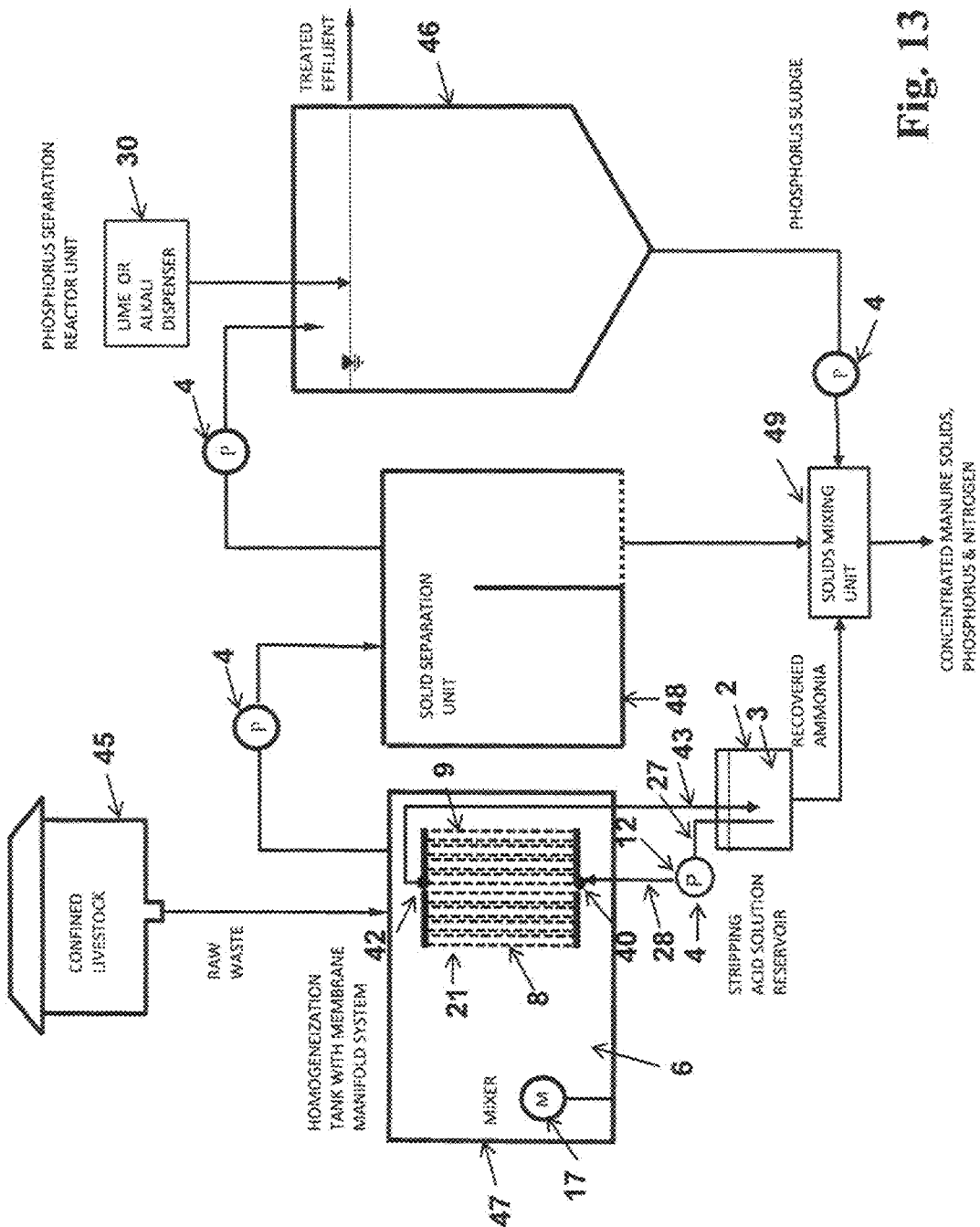
FIG. 13 is a nutrient recovery system that includes a homogenization tank 47 that contains liquid raw manure and an ammonia recovery system 20, a solid liquid separation unit 48, a phosphorus separation unit 46, and a solid mixing unit 49 to combine concentrated manure solids, phosphorus and nitrogen. Also shown are stripping solution 1, stripping solution tank/reservoir 2, pump 4, pump intake end 11, pump discharge end 12, pump intake flow line 27, pump discharge flow line 28, ammonia delivery flow line 43 membrane manifold 21, membrane manifold exit opening 42, membrane manifold entry opening 40, liquid effluent 6, flat membrane 8, and micron-sized gas-filled pores 9.

System 20 is used for recovering ammonia directly from raw liquid manure that is contained, for example, in pits under barns, manure storage tanks, or homogenization tanks. FIG. 13 shows a homogenization tank 47 that contains liquid raw manure collected from barn 45 and an ammonia recovery system 20, a solid liquid separation unit 48 in fluid communication with said homogenization tank and phosphorus separation unit 46, and a solid mixing unit 49 to combine concentrated manure solids, phosphorus and concentrated ammonia. The nutrient recovery system removes both phosphorus and nitrogen in a marketable, concentrated form, and disinfects the effluent with the alkaline pH in the phosphorus separation tank 46. A process pH of about 10.5 in the phosphorus separation tank 46 produces a sanitized effluent 6 and a process pH of about 9.5 results in a pathogen reduction of 4 logs (99.99%), which is the standard for Environmentally Superior Technology (Vanotti et al., Bioresource Technology, Vol. 100(22), 5406-5416, 2009). The ammonia recovery system 20 includes stripping solution 1, stripping solution tank/reservoir 2, pump 4, pump intake end 11, pump discharge end 12, pump intake flow line 27, pump discharge flow line 28, ammonia delivery flow line 43 membrane manifold 21, membrane manifold exit opening 42, membrane manifold entry opening 40, liquid effluent 6, flat membrane 8, and micron-sized gas-filled pores 9. Characteristic of liquid effluent 6 in the homogenization tank of liquid swine manure include BOD of about 6820 mg/L, soluble BOD of about 2499 mg/L, soluble COD of about 7065 mg/L, ammonium N of about 1251 mg/L, phosphorus of about 494 mg/L, and pH of about 7.85. The membrane manifold 21 is not permeable to the soluble COD or soluble BOD, and high concentration of soluble carbonaceous compounds and particle solids in effluent 6 does not affect this ammonia removal process where only the gaseous nitrogen form passes through the gas-permeable membrane. Thus there is no liquid passing through membrane 8 and membrane pore 9. Only the free ammonia $NH_3$ that is a gaseous form passes through, not the ionized $NH_4^+$ that is dissolved in the wastewater.

Figure 14:
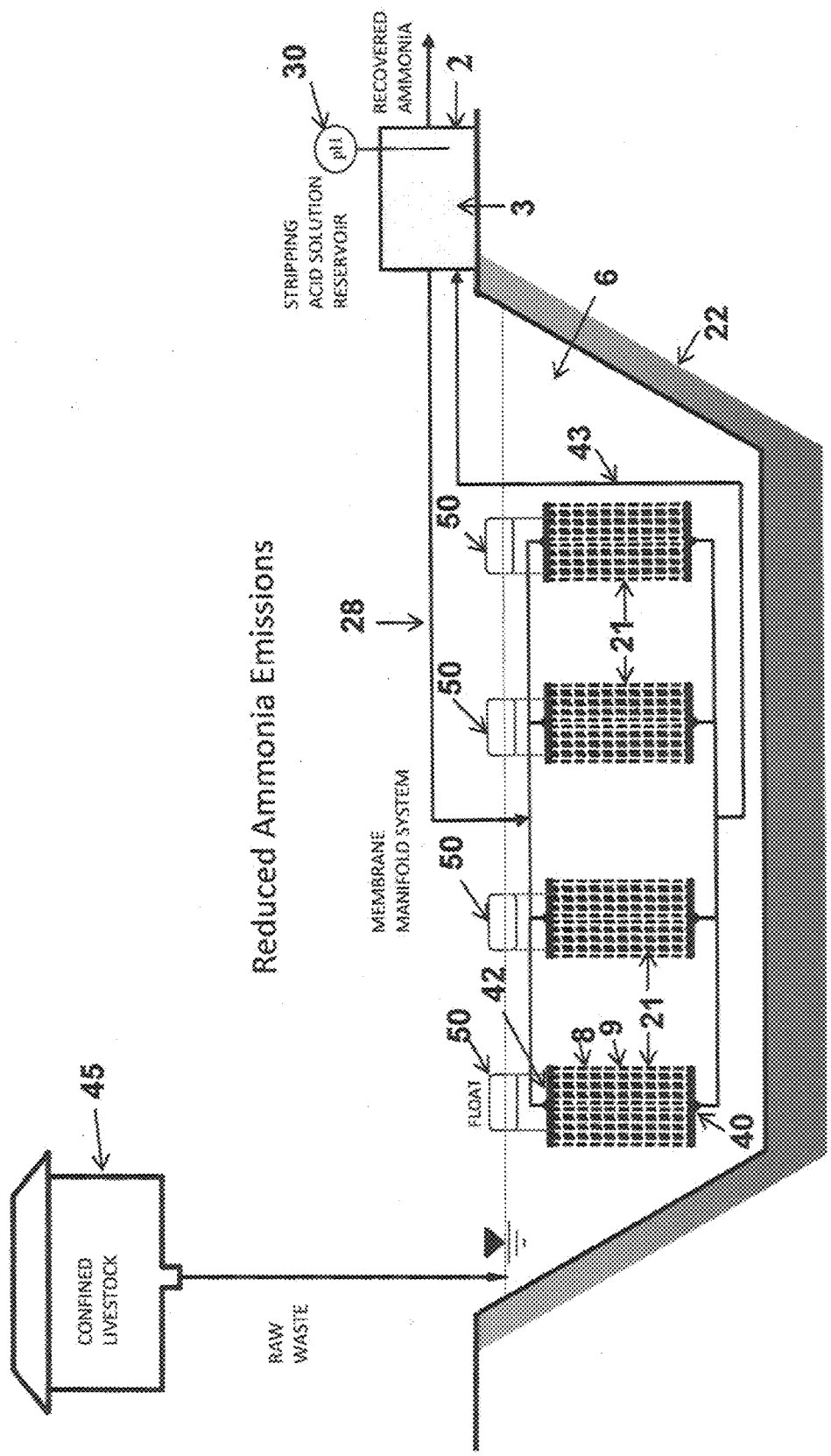
FIG. 14 is a cross sectional schematic diagram of ammonia capture system 20 used to reduce ammonia emissions from anaerobic livestock wastewater lagoon 22 and to recover concentrated ammonium salt products. Also shown are membrane manifolds 21, membrane manifold exit openings 42, membrane manifold entry openings 40, liquid effluent 6, flat membrane 8, micron-sized gas-filled pores 9, pump discharge flow line 28, pH measurement and alkali or acid addition dispenser 30, ammonia delivery flow line 43, confined livestock barn 45, and floats 50.
Figure 15:
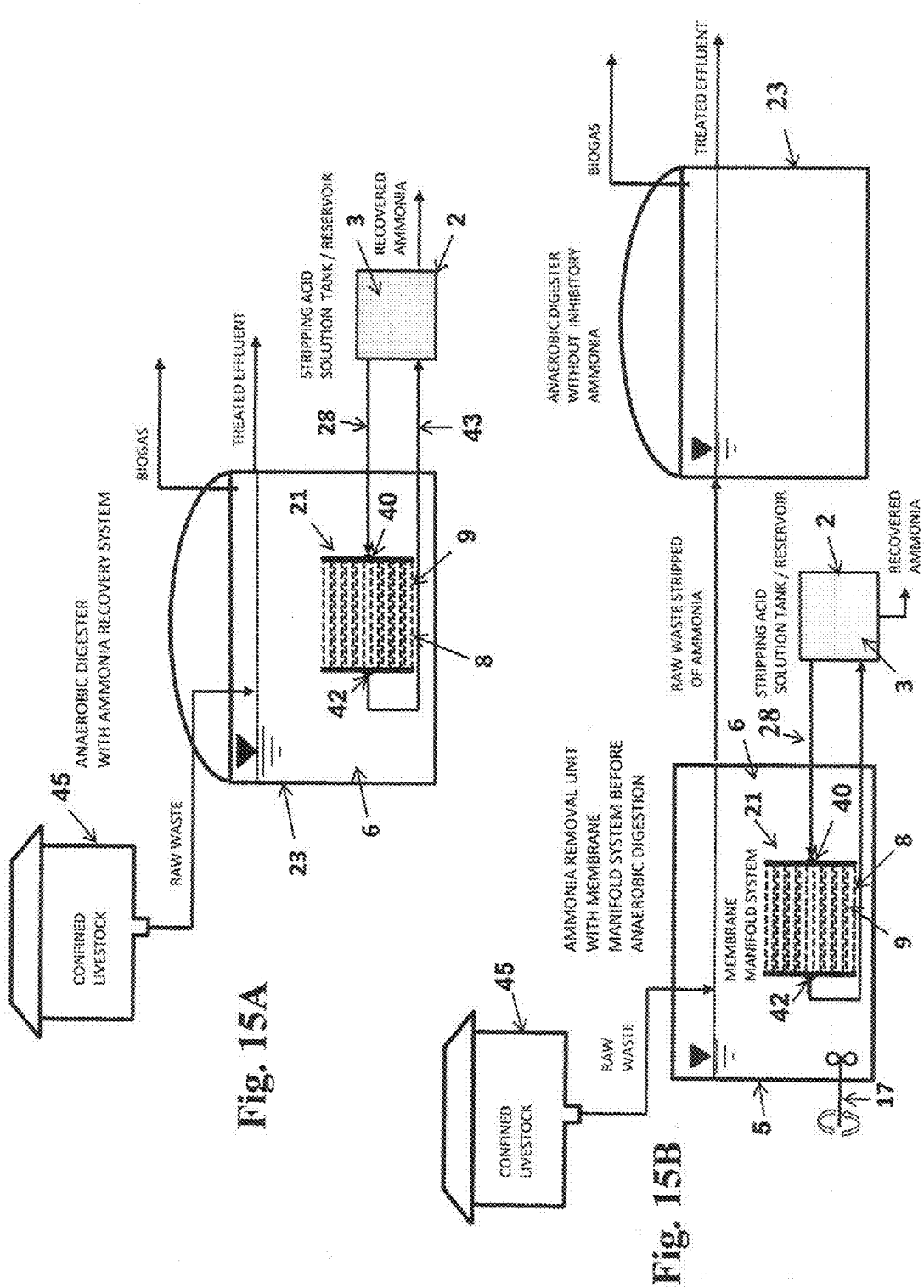
FIG. 15A is a cross sectional schematic diagram of ammonia capture system 20 used to remove and recover ammonia from an anaerobic digester 23 treating livestock waste to improve biogas production by eliminating the toxicity of high ammonia concentration to methanogens. Shown are confined livestock barn 45, membrane manifold 21, membrane manifold entry opening 40, membrane manifold exit opening 42, flat membranes 8, pores 9, pump discharge flow line 28, ammonia delivery flow line 43, tank/reservoir 2, and acid solution 3.
FIG. 15B is a cross sectional schematic diagram of ammonia capture system 20 used to remove and recover ammonia from raw liquid manure before anaerobic digestion (AD). Shown in this diagram are confined livestock barn 45, wastewater tank 5, mixer 17, membrane manifold 21, flat membranes 8, pores 9, membrane manifold entry opening 40, membrane manifold exit opening 42, liquid effluent 6, tank/reservoir 2, acid solution 3, and anaerobic digester 23.

FIG. 14 shows ammonia capture system 20 used in anaerobic lagoons that treat and store manure in order to reduce ammonia emmisons. Anaerobic lagoons 22 are waste treatment impoundments made by constructing an excavated pit, dam, embankment levee, or by a combination of these procedures (ANSI/ASAE EP403.3, FEB 2004). Anaerobic lagoons 22 are widely used to treat and store liquid manure from confined swine production facilities (Baker, Lagoon design and management for livestock waste treatment and storage, North Carolina Cooperative Extension Service Pub. No. EBAE 103-183). Ammonia emissions from anaerobic lagoons are large. Szogi et al. (Szogi et al., Transactions of the ASABE, Volume 49(1), 217-225, 2006) found that 12,540 kg $NH_3$ per year was lost from standard anaerobic swine lagoon, or 60.3% of the total manure N generated in the barns having 4360 pigs. FIG. 14 shows a crosssectional schematic drawing of ammonia capture system 20 used to reduce ammonia emissions from anaerobic livestock wastewater lagoon 22 and to recover of concentrated ammonia salts, Livestock waste accumulated in the confined livestock barn 45 is flushed daily using standard flushing systems (not shown) or weekly flushing using standard plug-flow systems into anaerobic lagoon 22 and subject to biological decomposition and stabilization. As the liquid manure 6 decomposes, it releases ammonia $NH_3$ gas that is captured by membrane manifolds 21 that are submerged and suspended with at least one float 50 in the liquid, thus preventing escape of ammonia to the atmosphere. The ammonia gas passes through the gas-filled membrane pores 9 and is recovered and concentrated in the stripping acid solution 3. A pH measurement and alkali or acid addition dispenser 30 is used to add acid into the acid solution reservoir 2 and maintain the pH of the stripping solution 3 below a set point of approximately 2. The level of ammonia removal from the open lagoon is that needed to significantly reduce ammonia emissions from the lagoon. The pH of the lagoon liquid 6 is naturally acidified approximately one unit pH when approximately 50% of the total ammonium N is removed with the membrane system. This is because one mol of $NH_3$ that passes the membrane produces one mole H+ in liquid effluent 6. As a result of reduced ammonia and pH, the free ammonia $NH_3$ in liquid effluent 6 is decreased more than approximately 90%.

FIGS. 15A and B show another embodiment of the claimed invention using system 20 in an anaerobic digester 23 to remove ammonia from the raw waste before anaerobic digestion to promote increased biogas production. FIG. 15A shows confined livestock barn 45, and an anaerobic digester including a membrane manifold 21, flat membrane 8, pores 9, membrane manifold entry opening 40, membrane manifold exit opening 42, liquid effluent 6, tank/reservoir 2, acid solution 23. FIG. 15B shows pretreatment of the liquid effluent 6 to remove ammonia with membrane manifold 21 to form a raw waste stripped of ammonia which is transported to anaerobic digester 23. This embodiment includes wastewater tank 5 that includes a mixer 17. The nutrient and energy recovery system recovers both concentrated ammonia and biogas. The membrane manifold 21 is not permeable to the soluble COD or soluble BOD, and high concentration of carbonaceous compounds and particle solids in effluent 6 in either anaerobic digester 23 or tank 5. These substances do not affect the ammonia removal process where $NH_3$ passes through gas-permeable membrane 7 or 8. Thus, there is no liquid or soluble COD passing through gas-permeable membrane 7 or 8. The liquid after the ammonia reduction treatment contains most of the carbonaceous original compounds that are useful for biogas production.

Figure 16:
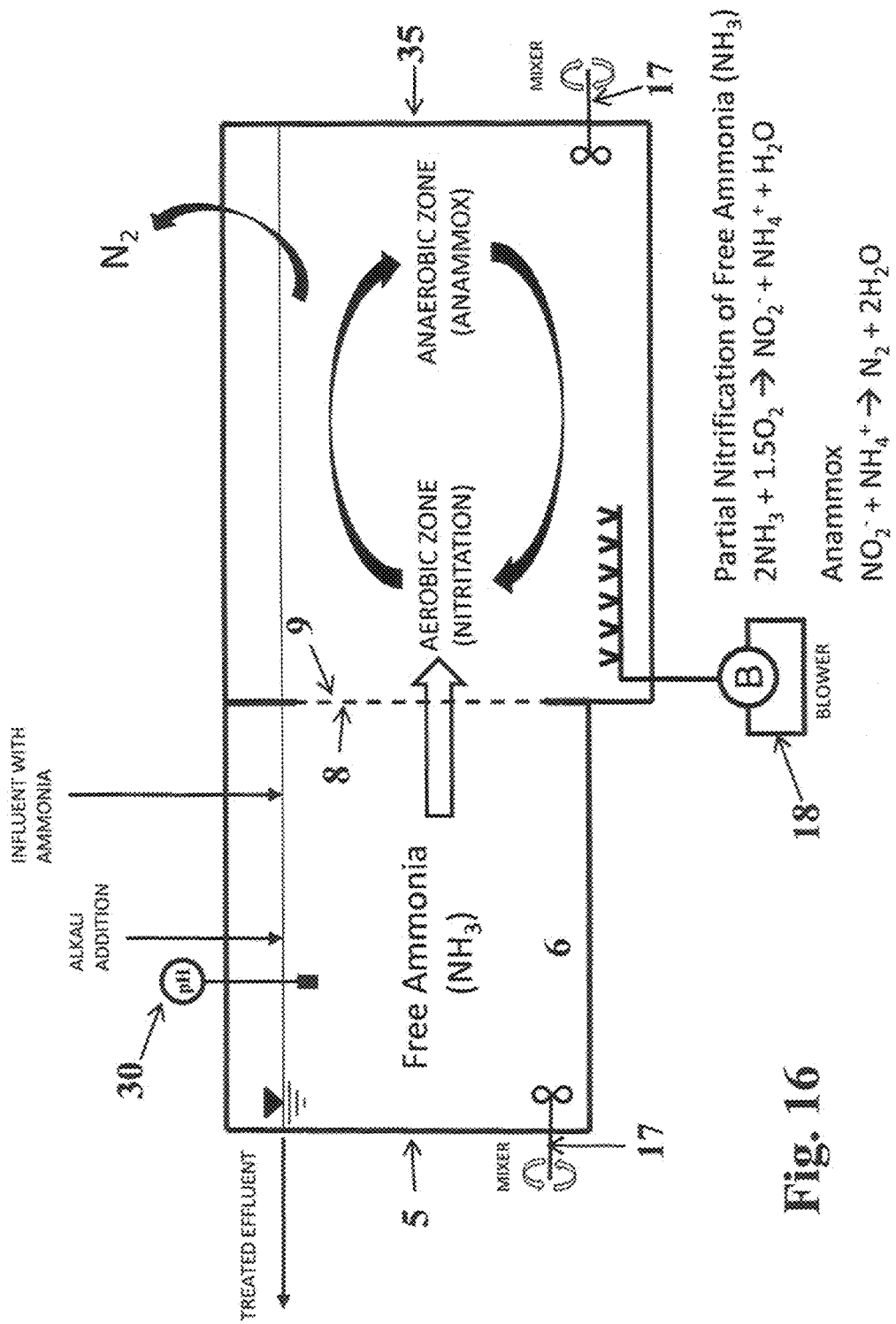
FIG. 16 is a cross sectional schematic diagram of a wastewater treatment system using an ammonia separation tank 5 with a gas-permeable flat membrane 8 having pores 9 in communication with a deamonification tank 35 that transforms the permeated free ammonia ($NH_3$) into dinitrogen gas ($N_2$) using biological partial nitritation and anammox process. Also shown are liquid effluent 6, mixer 17, blower 18 and pH measurement and alkali or acid addition dispenser 30.

FIG. 16 shows System 20 used In a system that uses biological deammonification for ammonia removal from wastewater (Vanotti et al., Published U.S. Patent Application 2011/0000851, Jan. 6, 2011; herein incorporated by reference in its entirety) which is a totally autotrophic process entailing two sequential reactions: partial nitritation of the ammonium (Equation 1) and anaerobic ammonium oxidation (anammox) in which ammonium is oxidized to nitrogen gas using nitrite as the electron acceptor (Equation 2, Schmidt et al., FEMS Microbiol. Rev. 27:481-492, 2003).

$$2NH_4^+ + 1.5O_2 \rightarrow NH_4^+ + NO_2^- + H_2O + 2H^+ \quad (1)$$

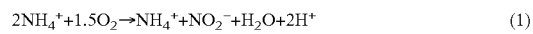

$$NH_4^+ + 1.32NO_2^- \rightarrow 1.02N_2 + 0.26NO_3^- + 2H_2O \quad (2)$$

The combination of the two conversion steps partial nitritation (Equation 1) and anammox (equation 2) in a single tank reactor yields Equation 3 (Yamagiwa, Y., and Furukawa, Proc. First International Anammox Symposium IANAS 2011, pp 217-223, 2011.). This results in an alkalinity requirement of approximately 1.14 moles H+ per mol of nitrogen removed (4 g $CaCO_3$ per g N removed).

$$NH_4^+ + 0.85O_2 \rightarrow 0.44N_2 + 0.11NO_2^- + 1.43H_2O + 1.14H^+ \quad (3)$$

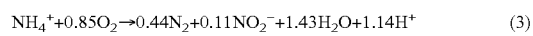

However, when a gas-permeable membrane 8 is used between wastewater tank 5 and a deamonification tank 35, the partial nitritation reaction starts with free ammonia ($NH_3$) that permeates from tank 5 into tank 35 (FIG. 16). Partial nitritation in tank 35 is defined by Equation 4.

$$2NH_3 + 1.5O_2 \rightarrow NH_4^+ + NO_2^- + H_2O \quad (4)$$

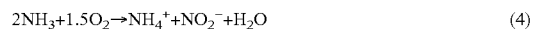

$$NH_4^+ + 0.85O_2 \rightarrow 0.44N_2 + 0.11NO_2^- + 1.43H_2O + 0.14H^+ \quad (5)$$

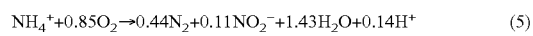

The combination of the two conversion steps partial nitritation (Equation 4) and anammox (Equation 2) in a single tank 35 using the present invention yields Equation 5. This new approach results in a reduced alkalinity requirement of approximately 0.14 moles H+ per mol of nitrogen removed (0.5 g $CaCO_3$ per g N removed). Compared with Equation 3, the use of a gas permeable membrane in combination with deamonification (FIG. 16) reduces approximately 87.5% of the alkalinity requirements. Since the soluble COD does not pass the pores of gas-permeable membrane 8 from tank 5 into tank 35, there is no need to remove substantial amounts of the COD in wastewater 6 in order for the partial nitritation to occur in tank 35 and remove the N though biological deamonification. FIG. 16 shows an ammonia separation tank 5 with a gas-permeable flat membrane 8 having pores 9 in gaseous fluid communication with a deamonification tank 35. The deamonification tank 35 transforms the permeated free ammonia into dinitrogen gas ($N_2$) using biological partial nitration and anammox process using Equations 4 and 2, respectively. The combination of equations 4 and 5 results in a new stoichiometry for single tank deamonification process which is described in Equation 5. Also shown in FIG. 16 are liquid effluent 6, mixer 17, and pH measurement and alkali or acid addition dispenser 30 used to increase availability of free ammonia NH3 for the deamonification process. Bacteria useful in this embodiment of the invention include any bacteria capable fo partial nitration. Examples include *Nitrosomonas* sp. strain HPNS.1, *Mycetocola* sp. strain HPNS.2, *Chitinophaga* sp. strain HPNS.3, Unclassified sp. strain HPNS.4, *Castellaniella* sp. strain HPSN.5, *Sejongia* sp. strain HPNS.6, *Kalistella* sp. strain HPNS.7, *Pedobacter* sp. strain HPNS.8, *Nitrosomonas* sp. strain HPNS,9 *Comamonas* sp strain HPNS.10, *Subtercola* sp. strain HPNS.11, *Coamonas* sp. strain HPNS.12, *Catellaniella* sp. strain HPNS.13, *Thermomonas* sp. strain HPNS.14, *Adhaeribacter* sp. strain HPNS 15, and *Comamonas* sp. strain HPNS.15, of the High Performance Nitrifying Sludge Culture HPNS, deposited under the Budapest Treaty as NRRL deposit accession number NRRL B-50298. Useful bacteria for the anammox step (Equation 2) is *Candidatus* Brocadia caroliniensis, of the Novel Anammox Bacterium Isolate deposited under the Budpest Treaty as NRRL deposit accession number NRRL B-50286 as disclosed in U.S. patent application Ser. No. 13/013,874, filed Jan. 26, 2001 and herein incorporated by reference in its entirety.

Figure 2:
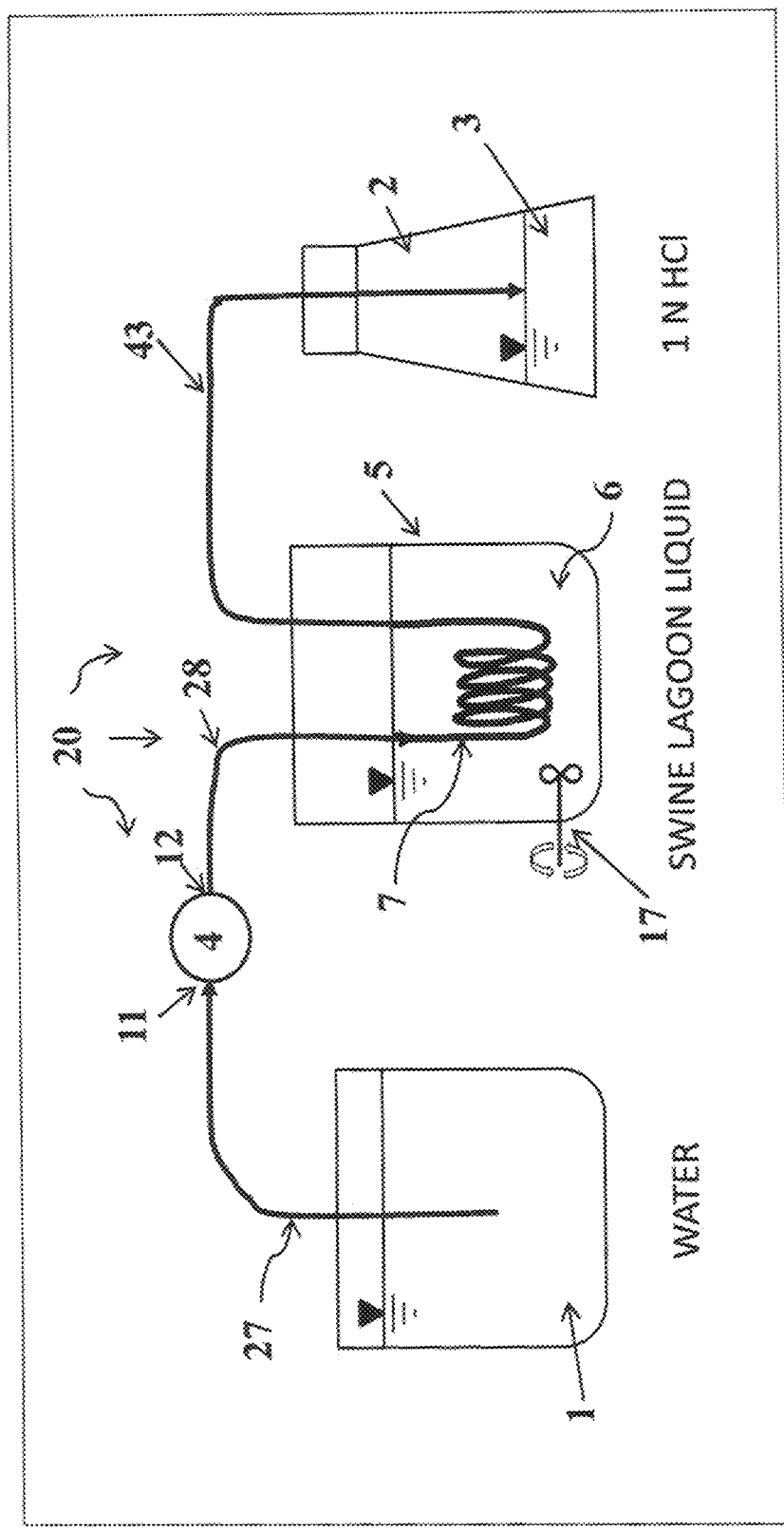
FIG. 2 is a drawing of ammonia ($NH_3$) capture system 20 capturing ammonia from liquid manure using hydrophobic, gas-permeable tubular membrane 7 in an open configuration. The stripping solution 1 was water, which was pumped through pump intake flow line 27 (continuous lines) and a gas-permeable tubular membrane 7 submerged in liquid swine manure which is continuously mixed with mixer 17. The water recovered ammonia was dripped through tube 43 in acid solution 3 in acid tank 2.

In another embodiment of the present invention, FIG. 17 shows a system for nitrogen enrichment of water using the ammonia capture system 20. Ammonia generated by liquid manure permeates through hydrophobic gas-permeable membrane 7 (FIGS. 2 and 17). Irrigation water or acidified irrigation water 1 contained in a water storage structure 2 or well is transported to a gas-permeable membrane using fluid pump 4. Membrane system 20 is submerged in liquid manure effluent 6 contained in a tank or containment structure 5. After passage through membrane system 20, the irrigation water charged with nitrogen is delivered to the root zone of plants 52 through ammonia delivery flow line 43 and drip tubing or tape 51. The membrane system 20 removes ammonia from the ammonia containing liquid effluent 6 and the irrigation water 2 in the membrane sweeps the ammonia to the ammonia delivery flow line 43 for irrigation. When only water is used, the water effluent is charged with approximately 50 mg/L of nitrogen and has an alkaline pH of approximately 10.5. After delivery into the soil, the ammoniated water reacts with the soil to form ionized NH4+. The N strength of the irrigation can be increased with the addition of diluted acids.

TABLE 1

Chemical characteristics of swine wastewater used in the examples.

| | Units | Digested Lagoon Liquid 1[b] | Digested Lagoon Liquid 2[c] | Raw Swine Wastewater[d] |
|---|---|---|---|---|
| TS | mg L$^{-1}$ | 1330 (3)[e] | 1763 (21) | 10865 (98) |
| TSS | mg L$^{-1}$ | 551 (13) | 333 (17) | 318 (26) |
| VSS | mg L$^{-1}$ | 389 (10) | 262 (13) | 164 (11) |
| BOD$_5$ | mg L$^{-1}$ | 651 (125) | 181 (6) | 308 (34) |
| COD | mg L$^{-1}$ | 1547 (72) | 1018 (25) | 1778 (69) |
| TKN | mg L$^{-1}$ | 195 (3) | 371 (4) | 1432 (38) |
| NH$_4$—N | mg L$^{-1}$ | 138 (3) | 302 (3) | 1366 (29) |
| pH | | 8.37 (0.00) | 8.28 (0.01) | 8.13 (0.02) |
| EC | mS cm$^{-1}$ | 1.69 (0.02) | 3.40 (0.01) | 16.70 (0.41) |
| Alkalinity | mg CaCO$_3$ L$^{-1}$ | 454 (3) | 857 (5) | 7390 (110) |

[a]TS, total solids; TSS, total suspended solids; VSS, volatile suspended solids; BOD5, 5 day biological oxygen demand; COD, chemical oxygen demand; TKN, total Kjeldahl nitrogen; NH4—N, ammoniacal nitrogen; EC, electrical conductivity
[b]Collected from an anaerobic swine lagoon in Darlington Co., South Carolina
[c]Collected from an anaerobic swine lagoon in Duplin Co., North Carolina
[d]Collected from solid separated swine house effluent in Sampson Co., North Carolina
[e]Mean (standard error of mean) of duplicate samples The following examples are intended only to further illustrate the invention and are not intended to limit the scope of the invention which is defined by the claims. Liquid swine manure is used as a model to exemplify the system 20 of the present invention The system 20 can be used for any liquid effluent where NH$_3$ is produced and accumulated.

EXAMPLE 1

Five bench-scale experiments were conducted using gas-permeable tubular membranes to remove ammonia from livestock wastewater.

In the first experiment, digested liquid swine manure was obtained from two anaerobic swine lagoons that contained approximately 140 and 300 mg NH$_4$/L and at a pH of approximately 8.3 to 8.4. In these anaerobic lagoons, raw flushed manure goes through anaerobic digestion process creating a digested liquid effluent. For this experiment, an open configuration was used meaning that the stripping solution 1 (water) was passed only one time through the tubular membrane 7 at a flow rate of 36 mL/hour (FIG. 2). The influent to the hollow interior 10 of membrane 7 is water and the effluent from the membrane 7 hollow interior 10 was ammoniated water. The ammoniated water effluent was then dripped into a second vessel, tank 2, that contained approximately 4 ml of 1N HCl 3 to convert the ammonia into ammonium and prevent ammonia loss through volatilization. The wastewater enclosure was a 300-mL glass beaker containing approximately 250 mL of swine wastewater. The gas-permeable tubular membrane 7 was made of expanded polytetrafluoroethylene (ePTFE) (International Polymer Engineering, Temple, Ariz.) and was used in the interior of the beaker submerged in the manure for NH$_3$ capture. The length of the tubular membrane 7 was approximately 68 cm with the following characteristics: outside diameter was approximately 2.0 mm, inner diameter was approximately 1.0 mm, wall thickness was approximately 0.5 mm, and average pore size was approximately 25 microns.

Figure 4:
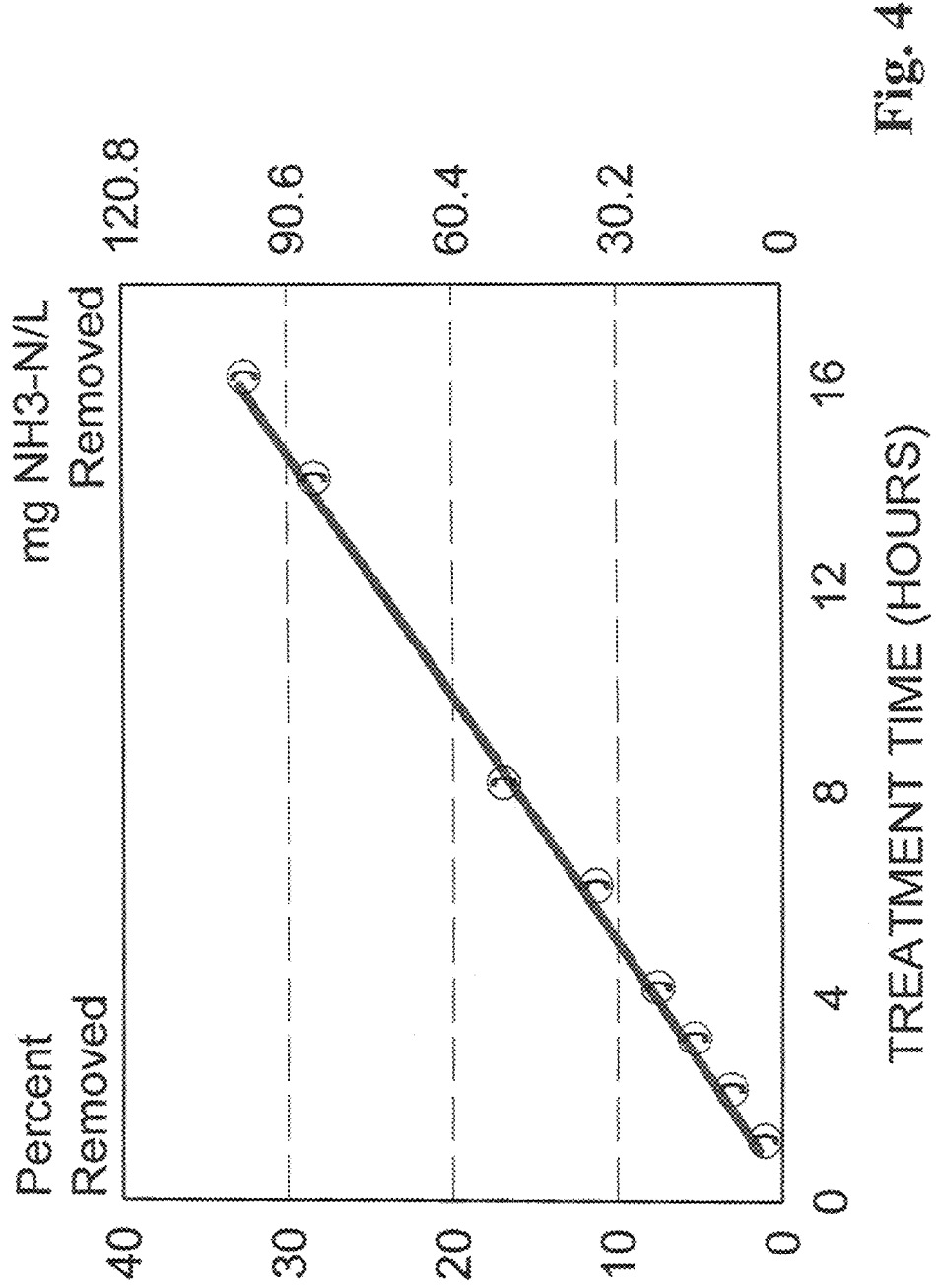
FIG. 4 is a graph showing ammonia removal from animal waste using a gas-permeable membrane (experiment 1). Swine lagoon liquid contained approximately 302 mg $NH_4$—N/L. Removal rate (line slope) was approximately 153 mg N/L/day, $R^2$=0.998.

The use of gas-permeable membranes to remove ammonia from liquid manure was effective. The removal of ammonia from liquid manure was linear with time, with an average removal rate of approximately 153 mg NH$_4$—N/L/day for liquid manure containing approximately 302 mg NH$_4$/L (FIG. 4). The distilled water used for stripping had 0 mg N/L and pH about=6.07. After the single pass through the 68-cm gas-permeable membrane tubing, the stripping water contained approximately 44.5 mg N/L and an alkaline pH of about 10.48 (ammoniated water). The rate of removal by the gas-permeable membrane system was influenced by the ammonium concentration in the manure. For example, the average removal rate increased from approximately 45 to approximately 153 mg NH$_4$—N/L/day when the ammonium concentration in the manure liquid increased from approximately 138 to approximately 302 mg NH$_4$—N/L, even when the pH was about the same, approximately 8.4 and 8.3, respectively.

For experiment 2, gas permeable membranes were evaluated to see if the membranes are permeable to soluble Chemical Oxygen Demand (COD). A synthetic wastewater was used and it contained a mixture of glucose and potassium hydrogen phthalate (KHP). The glucose provided approximately 500 mg soluble COD/L and the KHP provided approximately 1,000 COD/L. Experiment 2 used the same configuration and tubular membrane as experiment 1. The two differences were in the composition of the wastewater (soluble COD) and the collection of the stripping liquid effluent that was collected in the second vessel without acid.

Soluble carbonaceous compounds such as glucose and KHP did not pass through the gas membrane (Experiment 2). Even though the wastewater contained high soluble COD concentration of approximately 1500 mg COD/L, the stripping solution, water in this experiment, going through the membrane tube contained 0 mg COD/L during about a 2 hour test. This represents an advantage over biological N removal systems for manure because there is no need to remove the carbonaceous COD in order to remove the ammonia in the liquid.

For experiment 3, the effect of increasing the wastewater pH on the speed of ammonia recovery was tested. A synthetic wastewater was used containing approximately 300 mg NH$_4$/L and a pH of approximately 8.3 or 10.0. A closed configuration was used as shown in FIG. 3A-3C. The stripping solution for this experiment is acid. The closed loop delivery system for delivering acid from tank 2 in FIG. 3A to the hollow interior 10 of the microporous, hydrophobic, gas-permeable tubular membrane 7 is composed of fluid pump 4 having an intake end 11 and discharge end 12 and at least two hollow flow lines 27 and 28. Discharge flow line 28 has one end in fluid communication to the discharge end 12 of pump 4. Intake flow line 27 has a first end attached to the intake end 11 of pump 4 and a second end in said tank 2 for delivering acid solution 1 to said membrane system 15. The acid travels through tubing 11 to membrane 7 which is immersed in synthetic wastewater in wastewater tank 5. As in experiment 1, the gas-permeable tubular membrane 7 was made of expanded polytetrafluoroethylene (ePTFE) (International Polymer Engineering, Temple, Ariz.) and was used in the interior of the beaker submerged in the manure for $NH_3$ capture. The length of the tubular membrane 7 was approximately 68 cm with the following characteristics: outside diameter was approximately 2.0 mm, inner diameter was approximately 1.0 mm, wall thickness was approximately 0.5 mm, and average pore size was approximately 25 microns.

At equal N concentration in the wastewater, approximately 300 mg $NH_4$—N/L, the rate of ammonia recovery by the gas-permeable membrane was greatly increased with increased pH of the wastewater (Experiment 3, Table 2). For example, with a pH of about 8.3, the rate of N recovery was about 1.2% per hour. This rate was increased approximately 10 times to about 13% per hour at a pH of about 10.0 (Table 2 A). Recovery in the closed-loop system was optimized when the pH of the stripping tank solution was kept below 2. Availability of $NH_3$ in the wastewater and acidity in the stripping solution are important for quick and efficient N separation by the membrane system. At the lower wastewater pH of 8.3, the limitation of the system was the availability of ammonia $NH_3$. In this situation, lower flow rates of the stripping solution (Table 2 B) were equally effective than higher flow rates (Table 2A). However, when NH3 availability was high at the higher wastewater pH of 10, higher flow rates were needed for efficient ammonia removal.

Tables 2A and 2B. Effect of wastewater pH on the ammonia removal by hydrophobic gas-permeable membrane 7 using 300 mL of synthetic wastewater 6 containing approximately 300 mg N/L in the form of $NH_4Cl$. The pH was adjusted with alkali NaOH to approximately 8.3 and 10.0. The acid stripping tank 2 contained 100 mL of 1 N HCl that was continuously recycled in a closed-loop (FIG. 3).

| | A. Stripping Solution Recycle Time[a] = 1 hour | | | | | |
|---|---|---|---|---|---|---|
| | Initial Wastewater Effluent pH = 8.3[b] | | | Initial Wastewater Effluent pH = 10.0 | | |
| Time (hours) | Mass $NH_4$—N recovered in stripping tank 2 (mg) | $NH_4$—N Recovery from effluent wastewater 6[c] (%) | pH of stripping solution 1 | Mass $NH_4$—N recovered in stripping tank 2 (mg) | $NH_4$—N Recovery from effluent wastewater (%) | pH of stripping solution 1 |
| 0 | 0 | 0 | 1.08 | 0 | 0 | 1.08 |
| 1 | 0.86 | 0.96 | 1.11 | 7.82 | 8.69 | 0.99 |
| 2 | 2.44 | 2.71 | 0.98 | 26.51 | 29.46 | 1.16 |
| 3 | 3.72 | 4.13 | 0.99 | 38.6 | 42.89 | 1.28 |
| 4 | 4.77 | 5.3 | 1.4 | 48.86 | 54.29 | 1.6 |
| 5 | 5.39 | 5.99 | 1.0 | 56.4 | 62.67 | 1.8 |

| | B. Stripping Solution Recycle Time = 20 hours | | | | | |
|---|---|---|---|---|---|---|
| | Initial Wastewater Effluent pH = 8.3 | | | Initial Wastewater Effluent pH = 10.0 | | |
| Time (hours) | Mass $NH_4$—N recovered in stripping tank 2 (mg) | $NH_4$—N Recovery from effluent wastewater 6 (%) | pH of stripping solution 1 | Mass $NH_4$—N recovered in stripping tank 2 (mg) | $NH_4$—N Recovery from effluent wastewater (%) | pH of stripping solution 1 |
| 0 | 0 | 0 | 1.5 | 0 | 0 | 1.4 |
| 1 | 0.71 | 0.79 | 1.1 | 2.34 | 2.6 | 1.1 |
| 3 | 3.77 | 4.19 | 1.1 | 10.92 | 12.13 | 1.3 |
| 18 | 8.94 | 9.94 | 1.7 | 38.83 | 43.14 | 3.1 |
| 20 | 8.98 | 9.98 | 1.7 | 38.83 | 43.14 | 7.3 |

[a]The time required for 1 volume of the stripping solution 1 (100 mL) to pass through the system. 1 hr = 100 mL/h flow rate; 20 h = 5 mL/h flow rate.
[b]pH of an anaerobic swine lagoon liquid
[c]Percent of $NH_4$—N mass recovered in stripping tank 2 in relation to the mass of $NH_4$—N in initial wastewater effluent 6 (90 mg)

In experiments 4 and 5, the wastewater tank 5 consisted of a 2-L polyethylene terephthalate (PET) plastic jar, and the acid tank 2 consisted of a 500-mL glass flask containing 200 mL 1N $H_2SO_4$ (FIG. 3A). A peristaltic Manostat pump 4 (Cole-Parmer, Vernon Hills, Ill.) was used to continuously circulate the acid 1 through the tubular membrane 7 inside tank 5 and back into the acid tank 2 using flow rates of approximately 70-80 mL/day. Gas-permeable membranes made of expanded polytetrafluoroelthylene (EPTFE) (Phillips Scientific Inc, Rock Hill, S.C.) was used in the interior of tank 5 for $NH_3$ capture. The length of tubular membrane 7 used in experiments 4 and 5 was approximately 66 cm with an inner diameter of approximately 5.25 mm and a wall thickness of approximately 1.0 mm. The membrane 7 was submerged in approximately 1.68 L of manure liquid and the free ammonia was removed from the liquid swine manure before it escaped into the air (FIG. 3C). Ten batches were run using liquid swine manure containing approximately 1,500 mg/L $NH_4$—N. The same stripping acidic solution 3 was used in all the consecutive batches. Concentrated acid was added into the acid tank 2 as needed to endpoint pH approximately <1 whenever the pH of the acid solution increased to about 2.

Figure 5:
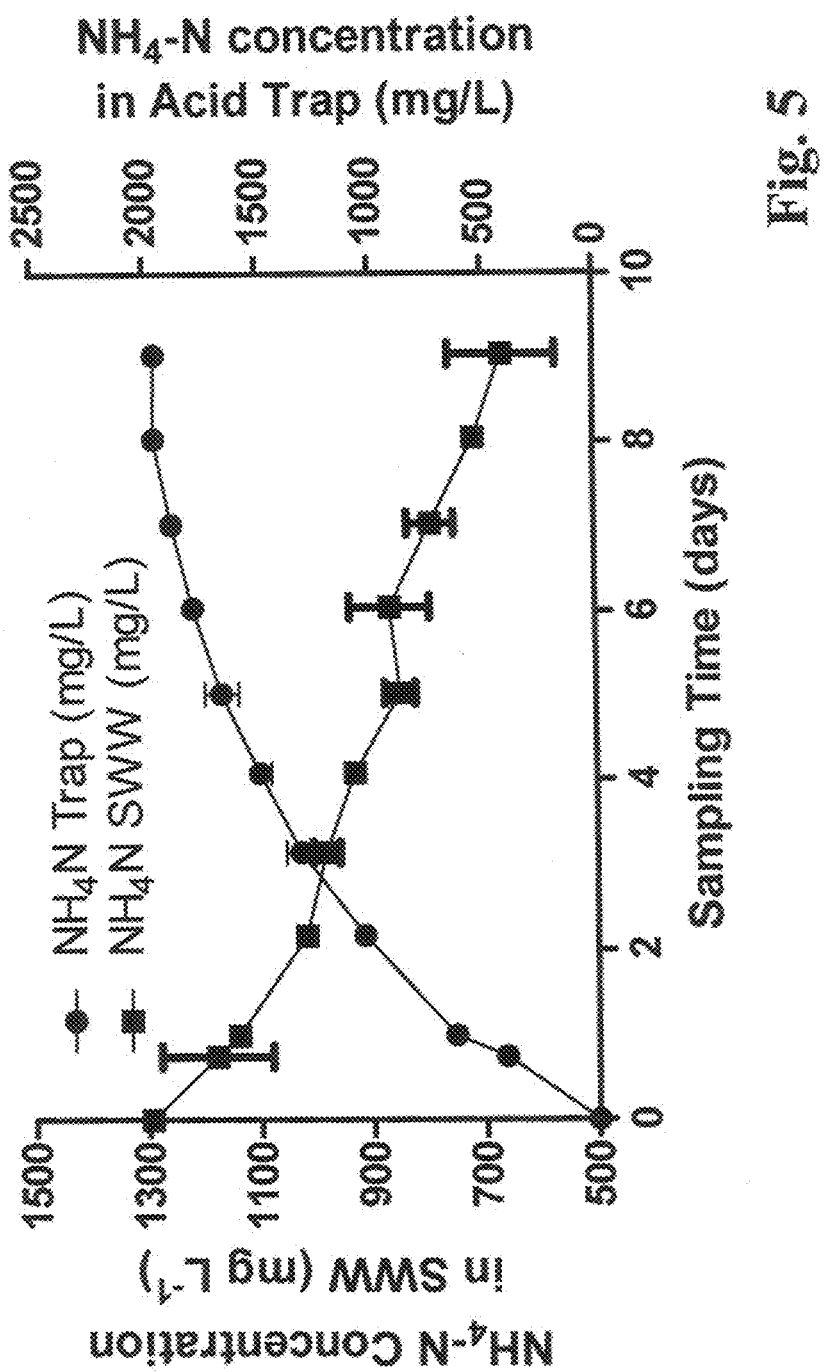
FIG. 5 is a graph showing removal of $NH_4$—N from swine wastewater (SWW) and recovery in the stripping solution (trap) using a gas-permeable membrane manifold
Figure 6:
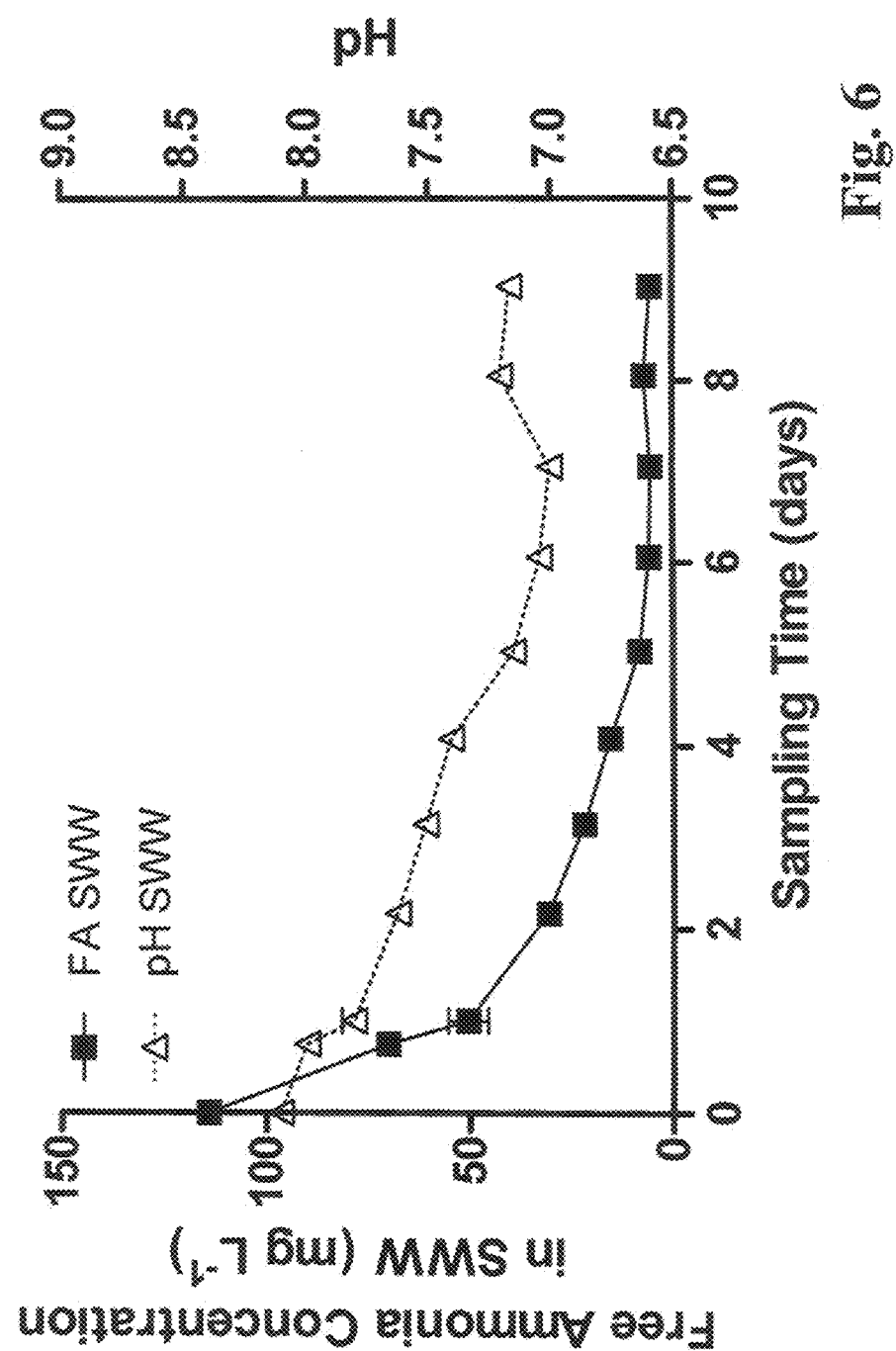
FIG. 6 is a graph showing removal of free ammonia (FA) from swine wastewater (SWW) using gas permeable membranes and changes in pH of SWW.

The fourth experiment evaluated the effect ammonia removal with a gas-permeable membrane on the natural acidification of the wastewater as the $NH_3$ is removed with the membrane system The wastewater was flushed raw swine manure that contained approximately 1,400 $NH_4$/L and a pH of about 8.1. Flushed raw swine manure is liquid manure that is flushed from confinement houses using a water conveyance system (Barkers and Driggers, 1981; Vanotti and Hunt, 1999; Barker, J. C. and L. B. Driggers. 1981. Design criteria for alternative swine waste flushing systems. In Livestock Waste: A renewable resource, 367-370. ASAE, St. Joseph, Mich. Vanotti, M. B. and P. G. Hunt. 1999. Solids and nutrient removal from flushed swine manure using polyacrylamides. Transactions of the ASAE 42(6) 1833-1840). With the membrane manifold installed for about 9 days, the $NH_4$—N concentration in the manure decreased about 50% from approximately 1,290 mg/L to approximately 663 mg/L (FIG. 5). On the other hand, the $NH_4$—N concentration in the stripping solution was concentrated from 0 mg/L to approximately 1,950 mg/L during the same period. Data in FIG. 6 show that as ammonia was being removed from the liquid manure, the pH of the manure decreased from approximately 8.11 to approximately 7.00. In the same 9-day treatment period, the free ammonia (FA) decreased from about 95%, from approximately 1,142 to approximately 5.4 mg/L. Thus an about 50% decrease in the total ammonia concentration with the membrane eliminated most of the free ammonia (FA), which constitutes the ammonia in the wastewater that escapes into the air (either during manure storage or land spraying) contributing to the problem of ammonia emissions in livestock operations.

Figure 7:
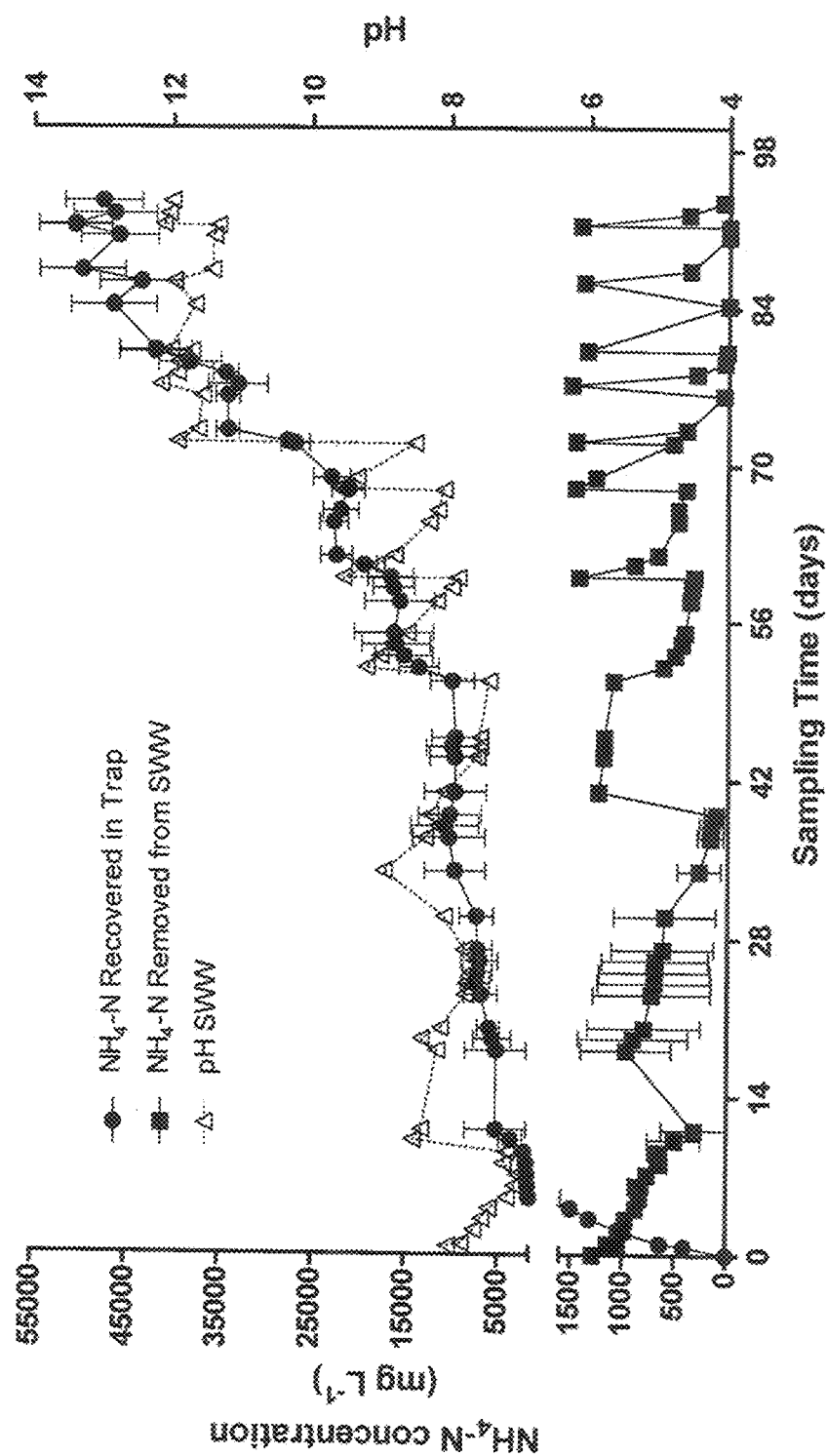
FIG. 7 is a graph showing removal of $NH_4$—N from swine wastewater (SWW) in ten consecutive batches using gas permeable membranes and corresponding N concentration increase in the acidic solution (trap).

The fifth experiment evaluated concentration of ammonia in the stripping solution by using the same stripping solution in 10 consecutive batches treating raw swine manure containing approximately 1,400 mg $NH_4$/L. Sodium hydroxide was applied to the manure to increase the pH and accelerate ammonia removal of the membranes. Sodium hydroxide was applied at the end of batches 1-3 and at the beginning of batches 4-10 (FIG. 7). pH ranged from about 9 to about 12. With a higher pH due to alkali addition, the ammonia in the liquid manure decreased faster and its recovery by the membrane system was quicker. For example, the time until no additional accumulation of $NH_4$—N in the recovery tank 2 was approximately 10 days, approximately 7 days, and approximately 2 days when the initial swine wastewater pH was approximately 8.11 (no alkali added), approximately 9.01 (approximately 0.46 g/L NaOH added), and approximately 10.08 (approximately 5.9 g/L added), respectively. After ten batches, the ammonia was recovered and concentrated in a clear solution containing approximately 53,000 mg/L $NH_4$—N(FIG. 7).

It will be clear to a person skilled in the art that the scope of the present invention is not limited to the examples discussed above, but that various changes and modifications thereof are possible without departing from the scope of the invention as defined in the appended claims.

INDEX OF THE ELEMENTS

1. Stripping Solution
2. Tank/Reservoir
3. Acid solution
4. Fluid Pump
5. Wastewater tank
6. Liquid Effluent
7. Tubular Membrane
8. Flat Membrane
9. Micron-sized Gas-filled Pores
10. Hollow Interior of Membrane
11. Pump Intake End
12. Pump Discharge End
13. First tubular membrane opening
14. Second tubular membrane opening
15. Membrane Assembly
17. Mixer
18. Blower
19. Flat membrane manifold
20. System
21. Membrane Manifold
22. Wastewater Lagoon
23. Anaerobic Digester
24. Interior Surface of Membrane
27. Pump Intake Flow Line
28. Pump Discharge Flow Line
29. Splitter of stripping solution
30. pH measurement and alkali or acid addition dispenser
31. Flat membrane connector
32. Heater
33. Dissolved oxygen measurement and control
34. Flat membrane supporting frame
35. Deamonification (nitritation-anammox) tank
36. Nitrification Inhibitor Dispenser
40. membrane assembly entry opening
42. membrane assembly exit opening
43. Ammonia Delivery Flow Line
44. Extraction Tank
45. Barn
46. Phosphorus Removal Tank
47. Homogenization Tank
48. Solid Separation Unit
49. Solid Mixing Unit
50. Float
51. Drip Tubing or Tape
52. Irrigated Plant

What is claimed is:

1. A system for reducing ammonia concentration in liquid effluents consisting essentially of at least one gas permeable membrane assembly allowing for the diffusion of ammonia gas from said liquid effluent into said membrane assembly, a reservoir containing a stripping solution, and a delivery system for (i) delivering the stripping solution from the reservoir to said membrane assembly to chemically change the ammonia gas to ammonia salts and for (ii) carrying the salts to a second reservoir or to said reservoir containing said stripping solution;
said delivery system comprising a pump having an intake end and a discharge end, and at least two hollow tubes, a first tube having one end attached to the discharge end of the pump and a second end attached to a first side of a gas permeable membrane assembly; and a second tube having a first end attached to a second side of said gas permeable membrane and a second end disposed above or in said reservoir for discharging ammonium salts to said reservoir.

2. The system according to claim 1 wherein said stripping solution is an acid.

3. The system according to claim 2 wherein said acid is selected from the group consisting of organic acids, mineral acids, precursors of organic acids and mineral acids, and mixtures thereof.

4. The system according to claim 3 wherein said organic acid is selected from the group consisting of citric, oxalic, lactic, and mixtures thereof.

5. The system according to claim 3 wherein said mineral acid is selected from the group consisting of sulfuric, hydrochloric, nitric, phosphoric, and mixtures thereof.

6. The system according to claim 3 wherein said precursor of said acids is selected from the group consisting of sodium bisulfate, sulfur, corn silage, carbohydrates, and mixtures thereof.

7. The system according to claim 1 wherein said stripping solution is water.

8. The system according to claim 1 wherein said membrane assembly includes at least one tubular membrane.

9. The system according to claim 1 wherein said membrane assembly includes at least one flat membrane.

10. The system according to claim 1 wherein said system is a closed loop system.

11. The system according to claim 1 wherein said system is an open loop system.

12. A method for producing ammonium salt from an ammonia-containing liquid effluent consisting essentially of:
capturing ammonia from a liquid effluent containing ammonia within the confines of a gas-permeable membrane assembly, contacting said ammonia with a stripping solution to produce ammonium salts, and transporting the salts to a reservoir for collection.

13. The method according to claim 12 wherein said stripping solution is an acid.

14. The method according to claim 13 wherein said acid is selected from the group consisting of organic acids, mineral acids, precursors of organic acids and mineral acids, and mixtures thereof.

15. The method according to claim 14 wherein said organic acid is selected from the group consisting of citric, oxalic, lactic, and mixtures thereof.

16. The method according to claim 14 wherein said mineral acid is selected from the group consisting of sulfuric acid, hydrochloric acid, nitric, phosphoric, and mixtures thereof.

17. The method according to claim 14 wherein said precursor of said acids is selected from the group consisting of sodium bisulfate, sulfur, corn silage, molasses, carbohydrates, and mixtures thereof.

18. The method according to claim 12 wherein chemical amendments are added to the liquid effluent to expedite the production of ammonia gas for capture by said gas-permeable membrane.

19. The method according to claim 18 wherein said chemical amendment increases the pH of the liquid effluent.

20. The method according to claim 18 wherein the chemical amendment is selected from the group consisting of calcium hydroxide, magnesium hydroxide, calcium oxide, magnesium oxide, dolomitic lime, sodium hydroxide, potassium hydroxide, and mixtures thereof.

21. The method according to claim 12 further including the step of increasing the temperature of said liquid effluent by an amount to increase ammonia capture by said membrane.

22. The method according to claim 12 further including a step of aerating said liquid effluent accompanied with inhibition of nitrification.

23. A system for recovering phosphorus from solid or municipal wastes consisting essentially of:
  (a) a phosphorus extraction tank containing solid animal or municipal wastes, and
  (b) a phosphorus removal tank in fluid communication with said phosphorus extraction tank wherein said phosphorus removal tank further comprises a membrane manifold system for diffusion of ammonia gas in fluid communication with a liquid effluent from said phosphorus extraction tank, a stripping solution to chemically change the ammonia gas to ammonia salts wherein said stripping solution is in fluid communication with said manifold system, a pump in fluid communication with said stripping solution and said membrane manifold system, and a pH measurement and alkali control dispenser in fluid communication with said liquid effluent in said phosphorus removal tank.

24. A system for treating liquid effluent consisting essentially of:
  (a) an effluent stream in fluid communication with a homogenization tank, a solid separation unit and a phosphorus and ammonia separation tank,
  (b) a homogenization tank in fluid communication with said effluent stream and said solid separation tank,
  (c) a solid separation unit in fluid communication with said homogenization tank and said phosphorus and ammonia removal tank,
  (d) a membrane manifold system for diffusion of ammonia gas in fluid communication with a liquid effluent from said solid separation unit, a stripping solution tank in fluid communication with said membrane manifold system, a stripping solution to chemically change the ammonia gas to ammonia salts contained in said stripping solution tank, wherein said stripping solution is in fluid communication with said membrane manifold system, and a pH measurement and alkali distribution control dispenser in fluid communication with said liquid effluent in said removal tank.

25. A system for treating liquid effluent consisting essentially of:
  (a) an effluent stream in fluid communication with a homongenization tank, a solid separation unit and a phosphorus separation tank, and
  (b) a homogenization unit in fluid communication with said effluent stream and said solid separation unit wherein said homogenization unit includes a membrane manifold system for diffusion of ammonia gas in fluid communication with a liquid effluent from said solid separation unit, a stripping solution tank in fluid communication with said membrane manifold system, a stripping solution to chemically change the ammonia gas to ammonia salts contained in said stripping solution tank wherein said stripping solution is in fluid communication with said membrane manifold system, a pump in fluid communication with said stripping solution and said membrane manifold system, and a pH measurement and alkali addition control dispenser in fluid communication with said liquid effluent in said removal tank,
  (c) a solid separation unit in fluid communication with said homogenization tank and said phosphorus removal tank; and
  (d) a phosphorus separation unit in fluid communication with said solid separation unit.

\* \* \* \* \*